United States Patent
Xue et al.

(10) Patent No.: US 11,159,278 B2
(45) Date of Patent: Oct. 26, 2021

(54) COMMUNICATION METHOD AND COMMUNICATIONS DEVICE

(71) Applicant: Huawei Technologies Co., Ltd., Shenzhen (CN)

(72) Inventors: Yifan Xue, Beijing (CN); Da Wang, Shenzhen (CN); Yun Liu, Shenzhen (CN); Jian Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/637,596

(22) PCT Filed: Aug. 8, 2017

(86) PCT No.: PCT/CN2017/096501
§ 371 (c)(1),
(2) Date: Feb. 7, 2020

(87) PCT Pub. No.: WO2019/028684
PCT Pub. Date: Feb. 14, 2019

(65) Prior Publication Data
US 2020/0220666 A1 Jul. 9, 2020

(51) Int. Cl.
*H04L 1/18* (2006.01)
*H04L 1/00* (2006.01)

(52) U.S. Cl.
CPC .......... *H04L 1/1819* (2013.01); *H04L 1/0061* (2013.01); *H04L 1/1854* (2013.01)

(58) Field of Classification Search
CPC ... H04L 1/0061; H04L 1/1614; H04L 1/1819; H04L 1/1854; H04L 1/1861
See application file for complete search history.

(56) References Cited

U.S. PATENT DOCUMENTS

2009/0327831 A1 12/2009 Xue et al.
2011/0199961 A1 8/2011 Narasimha et al.
(Continued)

FOREIGN PATENT DOCUMENTS

CN 101621364 A 1/2010
CN 102318254 A 1/2012
(Continued)

OTHER PUBLICATIONS

R1-1710462 Huawei, et al., "On HARQ-AOK multiplexing and/or bundling," 3GPP TSG RAN WG1 NR Ad Hoc Meeting, Qingdao, China, Jun. 27-30, 2017, 4 pages.
(Continued)

*Primary Examiner* — Phuc H Tran
(74) *Attorney, Agent, or Firm* — Conley Rose, P.C.

(57) ABSTRACT

This application provides a communication method and a communications device. The communication method includes: receiving, by a first device, N transport blocks TBs sent by a second device, where each TB includes at least one code block group CBG, and N is a positive integer; determining, by the first device, a hybrid automatic repeat request HARQ feedback bit of each CBG in the N TBs; determining, by the first device, a feedback bit stream of the N TBs based on the HARQ feedback bit of each CBG in the N TBs, where a quantity of bits of the feedback bit stream is equal to or less than a total quantity of CBGs in the N TBs; and sending, by the first device, the feedback bit stream to the second device. Compared with that in the prior art, the communication method provided in this application may improve flexibility of transmitting a feedback bit stream.

20 Claims, 9 Drawing Sheets

(56) References Cited

U.S. PATENT DOCUMENTS

| | | | |
|---|---|---|---|
| 2016/0080129 A1 | 3/2016 | Jang et al. | |
| 2016/0205679 A1 | 7/2016 | Yoo et al. | |
| 2017/0142593 A1 | 5/2017 | Seo et al. | |
| 2017/0303284 A1* | 10/2017 | Xu | H04L 1/0026 |
| 2018/0227085 A1* | 8/2018 | Chen | H04L 5/0055 |
| 2018/0279167 A1* | 9/2018 | Li | H04L 1/1822 |
| 2018/0317213 A1* | 11/2018 | Islam | H04L 1/1822 |
| 2020/0162202 A1* | 5/2020 | Goktepe | H04L 1/1671 |

FOREIGN PATENT DOCUMENTS

| | | |
|---|---|---|
| CN | 105515733 A | 4/2016 |
| CN | 106385309 A | 2/2017 |
| CN | 106664180 A | 5/2017 |
| CN | 106953718 A | 7/2017 |
| CN | 109845157 A | 9/2021 |
| EP | 3579466 A1 | 12/2019 |
| WO | 2019005838 A1 | 1/2019 |

OTHER PUBLICATIONS

R2-1704408, Ericsson, "Impact from multi-bit HARQ," 3GPP TSG-RAN WG2 #98, Hangzhou, P.R. of China, May 15-19, 2017, 4 pages.

R1-1706981, Huawei, "On HARQ-ACK bundling in NR," 3GPP TSG RAN WG1 Meeting #89, Hangzhou, China, May 15-19, 2017, 2 pages.

R1-1710727 Samsung, "HARQ-ACK Feedback for CBG-Based Retransmissions", 3GPP TSG RAN WG1 NR Ad-Hoc#2, Qingdao, P.R. China, Jun. 27-30, 2017, 4 pages.

R1-1710333, LG Electronics, "Support of HARQ-ACK multiplexing/bundling for NR," 3GPP TSG RAN WG1 Meeting NR Ad-Hoc#2, Qingdao, P.R. China, Jun. 27-30, 2017, 7 pages.

Chairman's Notes RAN1_#88bis_final, "RAN1 Chairman's Notes," 3GPP TSG RAN WG1 Meeting #88bis, Spokane, USA, Apr. 3-7, 2017, 113 pages.

Chairman's Notes RAN1_89_final, "RAN1 Chairman's Notes," 3GPP TSG RAN WG1 Meeting #89, Hangzhou, P.R. China, May 15-19, 2017, 144 pages.

Saeed R Khosravirad et al., "Flexible Multi-Bit Feedback Design for HARQ Operation of Large-Size Data Packets in 5G", IEEE Proceedings of VTC-2017 spring, Jun. 2017, total 6 pages.

Zhou Zhurong, "Harq Research and Improve Based on Lte System", Qingdao University of Scienceand Technology Master Degree Thesis, Jun. 2013, total 70 pages. With an English Abstract.

Kexue Wu et al., "HARQ Research and Improve Based on LTE System", Jun. 6, 2013, 70 pages.

* cited by examiner

Table 1

| Channel capacity (unit: bit) | A quantity of bits corresponding to each TB ||||||
|---|---|---|---|---|---|
| | A > B > C | A > C > B | B > A > C | B > C > A | C > A > B or C > B > A |
| At least 14 | [4 2 4 4] | [4 2 4 4] | [4 2 4 4] | [4 2 4 4] | [4 2 4 4] |
| 13 | [4 1 4 4] | [3 2 4 4] | [4 1 4 4] | [4 1 4 4] | [3 2 4 4] |
| 12 | [3 1 4 4] | [2 2 4 4] | [3 1 4 4] | [3 1 4 4] | [2 2 4 4] |
| 11 | [2 1 4 4] | [1 2 4 4] | [2 1 4 4] | [2 1 4 4] | [1 2 4 4] |
| 10 | [1 1 4 4] | [1 1 4 4] | [1 1 4 4] | [1 1 4 4] | [1 1 4 4] |
| 9 | [1 1 4 3] | [1 1 4 3] | [1 1 4 3] | [1 1 3 4] | [1 1 3 4] |
| 8 | [1 1 4 2] | [1 1 4 2] | [1 1 4 2] | [1 1 2 4] | [1 1 2 4] |
| 7 | [1 1 4 1] | [1 1 4 1] | [1 1 4 1] | [1 1 1 4] | [1 1 1 4] |
| 6 | [1 1 3 1] | [1 1 3 1] | [1 1 3 1] | [1 1 1 3] | [1 1 1 3] |
| 5 | [1 1 2 1] | [1 1 2 1] | [1 1 2 1] | [1 1 1 2] | [1 1 1 2] |
| 4 | [1 1 1 1] | [1 1 1 1] | [1 1 1 1] | [1 1 1 1] | [1 1 1 1] |

FIG. 13

Table 2

| Channel capacity (unit: bit) | A quantity of bits corresponding to each TB ||||| 
|---|---|---|---|---|---|
| | A > B > C | A > C > B | B > A > C | B > C > A | C > A > B or C > B > A |
| At least 14 | [4 2 4 4] | [4 2 4 4] | [4 2 4 4] | [4 2 4 4] | [4 2 4 4] |
| 13 | [4 1 4 4] | [3 2 4 4] | [4 1 4 4] | [4 1 4 4] | [3 2 4 4] |
| 12 | [3 1 4 4] | [3 1 4 4] | [3 1 4 4] | [3 1 4 4] | [3 1 4 4] |
| 11 | [3 1 4 3] | [3 1 4 3] | [3 1 4 3] | [3 1 3 4] | [3 1 3 4] |
| 10 | [2 1 4 3] | [2 1 4 3] | [2 1 4 3] | [3 1 3 3] | [3 1 3 3] |
| 9 | [2 1 4 2] | [2 1 4 2] | [2 1 4 2] | [2 1 3 3] | [2 1 3 3] |
| 8 | [1 1 4 2] | [1 1 4 2] | [1 1 4 2] | [2 1 2 3] | [2 1 2 3] |
| 7 | [1 1 4 1] | [1 1 4 1] | [1 1 4 1] | [2 1 2 2] | [2 1 2 2] |
| 6 | [1 1 3 1] | [1 1 3 1] | [1 1 3 1] | [1 1 2 2] | [1 1 2 2] |
| 5 | [1 1 2 1] | [1 1 2 1] | [1 1 2 1] | [1 1 1 2] | [1 1 1 2] |
| 4 | [1 1 1 1] | [1 1 1 1] | [1 1 1 1] | [1 1 1 1] | [1 1 1 1] |

FIG. 14

Table 3

| Channel capacity (unit: bit) | A quantity of bits corresponding to each TB ||
|---|---|---|
| | A > D | D > A |
| At least 8 | [2 2 2 2] | [2 2 2 2] |
| 7 | [2 1 2 2] | [2 1 2 2] |
| 6 | [1 1 2 2] | [2 1 1 2] |
| 5 | [1 1 2 1] | [1 1 1 2] |
| 4 | [1 1 1 1] | [1 1 1 1] |

FIG. 15

COMMUNICATION METHOD AND COMMUNICATIONS DEVICE

CROSS-REFERENCE TO RELATED APPLICATIONS

This application is a National Stage of International Patent Application No. PCT/CN2017/096501 filed on Aug. 8, 2017, which is hereby incorporated by reference in its entirety.

TECHNICAL FIELD

This application relates to the communications field, and more specifically, to a communication method and a communications device.

BACKGROUND

In LTE, both uplink data and downlink data are transmitted based on a transport block (Transmission Block, TB). To be specific, when HARQ information is fed back, each TB uses one bit to indicate a reception status of the TB, where 1 indicates correct reception (a CRC check succeeds), and 0 indicates failed reception (a CRC check fails).

Such TB-based transmission sometimes results in a waste of resources. Because once a small part of the entire TB is incorrectly received due to a poor channel status or the like, receiving of the entire TB fails, and consequently, retransmission of the entire TB is caused. To resolve this problem, CBG-based transmission is introduced in a new communications protocol (New Radio, NR). One TB includes one or more CBGs. When the HARQ information is fed back, each CBG uses one bit to indicate a reception status of the CBG. In this way, when some parts are incorrectly received due to a poor channel status or the like, only an affected CBG fails to be received, and is retransmitted. However, another CBG that is not affected does not need to be retransmitted. Therefore, retransmission overheads can be reduced.

However, a difference between feeding back the HARQ information based on the TB and feeding back the HARQ information based on the CBG lies in that, a feedback bit that needs to be uploaded increases. Naturally, a higher requirement is imposed on a channel capacity of an uplink channel.

For the foregoing problem, a HARQ bundling (bundling) technology is proposed in the prior art. The HARQ bundling technology is HARQ bundling at a CBG level. Specifically, an "AND" operation is performed on HARQ feedback bits of a plurality of CBGs, and then an operation result is fed back to a base station. In addition, it is pointed out in the prior art that the HARQ bundling at a CBG level is equivalent to transmission of a TB-based HARQ feedback. The "AND" operation is performed on HARQ feedback bits of all CBGs in one TB to obtain one feedback bit. To be specific, when the HARQ information is reported, still one TB corresponds to one feedback bit.

It should be understood that the HARQ bundling (bundling) technology in the prior art violates an original intention of introducing the CBG-based transmission in NR.

SUMMARY

This application provides a communication method and a communications device, to improve flexibility of transmitting a feedback bit stream.

According to a first aspect, a communication method is provided. The communication method includes: receiving, by a first device, N transport blocks TBs sent by a second device, where each TB includes at least one code block group CBG, and N is a positive integer; determining, by the first device, a hybrid automatic repeat request HARQ feedback bit of each CBG in the N TBs; determining, by the first device, a feedback bit stream of the N TBs based on the HARQ feedback bit of each CBG in the N TBs, where a quantity of bits of the feedback bit stream is equal to or less than a total quantity of CBGs in the N TBs; and sending, by the first device, the feedback bit stream to the second device.

In the prior art, a solution of directly feeding back HARQ feedback bits of each CBG may reduce an amount of retransmitted data, but has a relatively high requirement for a channel capacity of an uplink channel. In the prior art, HARQ feedback bits of a CBG in each TB are bundled as one bit. A solution of feeding back one bit for each TB may reduce a requirement for a channel capacity of an uplink channel, but increase an amount of retransmitted data. In other words, in the prior art, reduction in an amount of fed back data and reduction in an amount of retransmitted data cannot be implemented at the same time.

However, in this application, a manner of determining the feedback bit stream is not limited. The feedback bit stream in the N TBs may be obtained directly based on the HARQ feedback bit of each CBG in the N TBs. To be specific, the feedback bit stream is obtained without a bundling operation. Alternatively, HARQ feedback bits of a CBG in the N TBs may be bundled in a bundling manner to obtain the feedback bit stream in the N TBs. For example, the bundling manner is to bundle HARQ feedback bits of every M CBGs in the N TBs as one bit. For another example, the bundling manner is to bundle HARQ feedback bits of only some CBGs in the N TBs to obtain one or more bits. For another example, the bundling manner is to bundle HARQ feedback bits of a CBG in each of the N TBs as one bit.

Therefore, in the solution provided in this application, the feedback bit stream is determined based on the HARQ feedback bit of each CBG in the TBs, but a correspondence between the feedback bit stream and the HARQ feedback bit of each CBG is not limited. Compared with that in the prior art, flexibility of transmitting the feedback bit stream can be improved.

Bundling HARQ feedback bits of two CBGs as one feedback bit means performing an "AND" operation on the HARQ feedback bits of the two CBGs to obtain one bit.

With reference to the first aspect, in a possible implementation of the first aspect, a process of determining the feedback bit stream specifically includes: selecting a processing manner used to determine the feedback bit stream; and obtaining the feedback bit stream based on the HARQ feedback bit of each CBG in the N TBs in the processing manner.

Specifically, the processing manner is to obtain the feedback bit stream in the N TBs directly based on the HARQ feedback bit of each CBG in the N TBs. Alternatively, the processing manner is to bundle HARQ feedback bits of a CBG in the N TBs in a bundling manner, to obtain the feedback bit stream in the N TBs. In actual application, an appropriate processing manner may be selected based on an actual requirement.

In an optional implementation, when it is determined that a channel capacity of an uplink channel is sufficient to transmit HARQ feedback bits of all CBGs in the N TBs, the feedback bit stream in the N TBs is formed directly based on the HARQ feedback bit of each CBG in the N TBs. When it is determined that a channel capacity of an uplink channel is insufficient to transmit HARQ feedback bits of all CBGs in the N TBs, HARQ feedback bits of a CBG in the N TBs are bundled in a bundling manner, so that a quantity of bits of a finally obtained feedback bit stream does not exceed the channel capacity of the uplink channel.

It should be understood that an uplink channel allocated to a terminal device by a network device has a channel capacity. In other words, the terminal device can transmit only data whose quantity of bits does not exceed the channel capacity.

In the prior art, alternatively, it is specified that a HARQ feedback bit of each CBG is directly fed back, or it is specified that HARQ feedback bits of a CBG in each TB are bundled as one bit, and one bit is fed back for each TB. In other words, in the prior art, the manner of determining the feedback bit stream is fixed.

According to the solution provided in this application, the quantity of bits of the feedback bit stream of the N TBs can be greater than N and less than the total quantity of CBGs included in the N TBs. Therefore, compared with that in the prior art, the quantity of bits of the feedback bit stream may be reduced to some extent, and a bundling granularity may also be reduced to some extent. In this way, scheduling of the feedback bit stream is more flexible, and an amount of retransmitted data may also be reduced.

Optionally, in an implementation, the second device sends the N TBs to the first device by using a single carrier. Correspondingly, the first device receives the N TBs by using the single carrier.

Optionally, in another implementation, the first device is configured with carrier aggregation (Carrier Aggregation, CA), and the second device sends the N TBs to the first device by using a plurality of carriers. Correspondingly, the first device receives the N TBs by using the plurality of carriers.

With reference to the first aspect, in a possible implementation of the first aspect, the determining, by the first device, a feedback bit stream of the N TBs based on the HARQ feedback bit of each CBG in the N TBs includes: determining, by the first device, a first threshold, where the first threshold indicates that HARQ feedback bits of a CBG whose quantity reaches the first threshold are bundled as one feedback bit; and bundling, by the first device, HARQ feedback bits of the CBGs in the N TBs based on the first threshold, to obtain the feedback bit stream.

Specifically, the first threshold indicates that an "AND" operation is performed on HARQ feedback bits of every X CBGs to obtain one corresponding bit, where X is equal to the first threshold. It should be understood that the first threshold is an integer greater than 1. It should be understood that if a quantity of remaining CBGs is less than the first threshold, an "AND" operation is performed on HARQ feedback bits of the remaining CBGs to obtain one bit.

The first threshold may also be referred to as a bundling size (Bundling Size) or a bundling granularity (Bundling Granularity).

In the solution provided in this application, the HARQ feedback bits of the CBG in the TBs are bundled based on the first threshold, to obtain the feedback bit stream of the TBs. A value of the first threshold is not limited. Therefore, scheduling of the feedback bit stream is more flexible.

In addition, in this embodiment, the quantity of bits of the feedback bit stream of the N TBs can be greater than N and less than the total quantity of CBGs included in the N TBs. Therefore, compared with that in the prior art, the quantity of bits of the feedback bit stream may be reduced to some extent, and a bundling granularity may also be reduced to some extent. In this way, scheduling of the feedback bit stream is more flexible, and an amount of retransmitted data may also be reduced. Therefore, compared with that in the prior art, the solution provided in this embodiment not only may implement flexible transmission of the feedback bit stream, but also may reduce an amount of retransmitted data as much as possible on the premise of satisfying the channel capacity of the uplink channel. In other words, reduction in an amount of fed back data and reduction in an amount of retransmitted data may be better implemented.

In an optional implementation, a bundling operation based on the first threshold is valid only for HARQ feedback bits of CBGs in a same TB. It may also mean that the bundling operation based on the first threshold is valid only for intra-TB bundling. The bundling, by the first device, HARQ feedback bits of the CBGs in the N TBs based on the first threshold, to obtain the feedback bit stream includes: bundling, by the first device, HARQ feedback bits of a CBG of each of the N TBs based on the first threshold, to obtain the feedback bit stream, where CBGs corresponding to a same bit in the feedback bit stream belong to a same TB.

In another optional implementation, N is an integer greater than 1, to be specific, the N TBs are at least two TBs. The bundling operation based on the first threshold is valid for both HARQ feedback bits of CBGs in a same TB and HARQ feedback bits of CBGs of different TBs. It may also mean that the bundling operation based on the first threshold is valid for both intra-TB bundling and inter-TB bundling. The bundling, by the first device, HARQ feedback bits of a CBG in the N TBs based on the first threshold, to obtain the feedback bit stream includes: bundling, by the first device, the HARQ feedback bits of the CBGs in the N TBs uniformly based on the first threshold, to obtain the feedback bit stream, where CBGs corresponding to at least one bit in the feedback bit stream belong to different TBs.

Optionally, in an implementation of determining the first threshold, the first device receives first indication information sent by the second device, where the first indication information indicates the first threshold; and the first device determines the first threshold based on the first indication information.

Specifically, the network device may calculate the first threshold based on a channel capacity of a current uplink channel and the total quantity of CBGs in the N TBs, and then notify the terminal device of the first threshold by using the first indication information.

Optionally, the first indication information may be any one of the following: system information, radio resource control (Radio Resource Control, RRC) signaling, L1 signaling, and L2 signaling.

When the first indication information is L1 signaling, dynamic configuration of the first threshold may be implemented. It should be understood that the network device dynamically notifies the terminal device of the first threshold by using the L1 signaling.

The first threshold may also be referred to as a bundling size (Bundling Size) or a bundling granularity (Bundling Granularity).

Therefore, in this embodiment, scheduling of the feedback bit stream is more flexible by using different bundling sizes or bundling granularities for different TBs.

Optionally, in another implementation of determining the first threshold, the first device determines a second threshold, where the second threshold indicates a threshold of the quantity of bits of the feedback bit stream; and the first device determines the first threshold based on the second threshold and the total quantity of CBGs in the N TBs.

Specifically, a quotient is obtained by dividing the total quantity of CBGs in the N TBs by the second threshold. A minimum integer greater than the quotient is determined as the first threshold.

The second threshold may be equal to or less than the channel capacity of the uplink channel.

Optionally, in an implementation, the first device receives second indication information sent by the second device, where the second indication information indicates the second threshold; and the second threshold is determined based on the second indication information.

Specifically, the second indication information may be any one of the following: system information, RRC signaling, L1 signaling, and L2 signaling.

Optionally, in another implementation, the first device determines the second threshold based on channel information of an uplink channel used to carry the feedback bit stream.

Specifically, the channel information is information about a quantity of bits carried by the uplink channel.

In the solution provided in this application, the HARQ feedback bits of the CBG in the TBs are bundled based on the first threshold, to obtain the feedback bit stream of the TBs. A value of the first threshold is not limited. Therefore, scheduling of the feedback bit stream is more flexible.

In addition, according to the solution provided in this application, the quantity of bits of the feedback bit stream of the N TBs can be greater than N and less than the total quantity of CBGs included in the N TBs. Therefore, compared with that in the prior art, the quantity of bits of the feedback bit stream may be reduced to some extent, and a bundling granularity may also be reduced to some extent. In this way, scheduling of the feedback bit stream is more flexible, and an amount of retransmitted data may also be reduced. Therefore, compared with that in the prior art, the solution provided in this embodiment not only may implement flexible transmission of the feedback bit stream, but also may reduce an amount of retransmitted data as much as possible on the premise of satisfying the channel capacity of the uplink channel. In other words, reduction in an amount of fed back data and reduction in an amount of retransmitted data may be better implemented.

With reference to the first aspect, in a possible implementation of the first aspect, the determining, by the first device, a feedback bit stream of the N TBs based on the HARQ feedback bit of each CBG in the N TBs includes: receiving, by the first device, third indication information sent by the second device, where the third indication information indicates that HARQ feedback bits of at least two CBGs in at least one of the N TBs are to be bundled; and bundling, by the first device, the HARQ feedback bits of the at least two CBGs in the at least one TB based on the third indication information, to obtain the feedback bit stream.

In the solution provided in this application, the first device bundles the HARQ feedback bits of the CBGs in the N TBs based on an indication of the second device, to obtain the feedback bit stream. Therefore, according to the solution provided in this embodiment, the terminal device is enabled to perform any bundling operation under an instruction of the network device, so that scheduling of the feedback bit stream is more flexible.

With reference to the first aspect, in a possible implementation of the first aspect, N is an integer greater than 1; and the determining, by the first device, a feedback bit stream of the N TBs based on the HARQ feedback bit of each CBG in the N TBs includes: determining, by the first device, a third threshold, where the third threshold indicates a threshold of the quantity of bits of the feedback bit stream; and bundling, by the first device, the HARQ feedback bits of the CBGs in the N TBs based on a priority of a TB, to obtain the feedback bit stream, where the quantity of bits of the feedback bit stream is less than or equal to the third threshold, and the priority of the TB is determined according to at least one of the following priority conditions: a priority condition 1: determining a priority of a TB based on a service type of the TB; a priority condition 2: determining a priority of a TB based on a scheduling time of the TB; a priority condition 3: determining a priority of a TB based on a quantity of CBs included in at least one CBG in the TB; and a priority condition 4: determining a priority of a TB based on a quantity of CBGs included in the TB.

In the solution provided in this application, the feedback bit stream of the N TBs is determined based on the HARQ feedback bits of the CBGs in the N TBs and according to a preset priority condition, and an instruction of the network device does not need to be received, so that signaling overheads may be reduced.

In addition, according to the solution provided in this application, the quantity of bits of the feedback bit stream of the N TBs can be greater than N and less than the total quantity of CBGs included in the N TBs. Therefore, compared with that in the prior art, the quantity of bits of the feedback bit stream may be reduced to some extent, and a bundling granularity may also be reduced to some extent. In this way, scheduling of the feedback bit stream is more flexible, and an amount of retransmitted data may also be reduced.

Therefore, compared with that in the prior art, the solution provided in this embodiment not only may implement flexible transmission of the feedback bit stream, but also may reduce an amount of retransmitted data as much as possible on the premise of satisfying the channel capacity of the uplink channel. In other words, reduction in an amount of fed back data and reduction in an amount of retransmitted data may be better implemented.

With reference to the first aspect, in a possible implementation of the first aspect, the priority condition 1 indicates that a TB with a lower service priority has a higher priority;

the priority condition 2 indicates that a TB with an earlier scheduling time has a higher priority;

the priority condition 3 indicates that a TB with a smaller quantity of CBs included in a CBG has a higher priority; and the priority condition 4 indicates that a TB with a smaller quantity of included CBGs has a higher priority, or the priority condition 4 indicates that a TB with a larger quantity of included CBGs has a higher priority.

With reference to the first aspect, in a possible implementation of the first aspect, the at least one priority condition includes at least two priority conditions, and there is also an execution sequence priority between the at least two priority conditions.

With reference to the first aspect, in a possible implementation of the first aspect, in a process of bundling HARQ feedback bits of a CBG in one TB, HARQ feedback bits of a CBG in a next TB are bundled only when the TB corresponds to one feedback bit.

With reference to the first aspect, in a possible implementation of the first aspect, in a process of bundling HARQ feedback bits of CBGs in the plurality of TBs, the HARQ feedback bits of the CBGs in the plurality of TBs are bundled in turn.

With reference to the first aspect, in a possible implementation of the first aspect, the at least one priority condition is pre-configured, or is configured by the second device; and when the at least one priority condition includes the at least two priority conditions, the execution sequence priority between the priority conditions is also pre-configured, or is configured by the second device.

With reference to the first aspect, in a possible implementation of the first aspect, the determining a third threshold includes: receiving fourth indication information sent by the second device, where the fourth indication information indicates the third threshold; or determining the third threshold based on channel information of an uplink channel used to carry the feedback bit stream.

According to a second aspect, a communication method is provided. The communication method includes: sending, by a second device, N transport blocks TBs to a first device, where each TB includes at least one code block group CBG, and N is a positive integer; receiving, by the second device, a feedback bit stream sent by the first device, where the feedback bit stream is determined based on a hybrid automatic repeat request HARQ feedback bit of a CBG in the N TBs, and a quantity of bits of the feedback bit stream is less than or equal to a total quantity of CBGs in the N TBs.

With reference to the second aspect, in a possible implementation of the second aspect, the feedback bit stream is obtained by bundling HARQ feedback bits of the CBGs in the N TBs based on a first threshold, and the first threshold indicates that HARQ feedback bits of a CBG whose quantity reaches the first threshold are bundled as one feedback bit.

With reference to the second aspect, in a possible implementation of the second aspect, CBGs corresponding to a same bit in the feedback bit stream belong to a same TB; or CBGs corresponding to at least one bit in the feedback bit stream belong to different TBs.

With reference to the second aspect, in a possible implementation of the second aspect, the communication method further includes: sending, by the second device, first indication information to the first device, where the first indication information indicates the first threshold; or sending, by the second device, second indication information to the first device, where the second indication information indicates a second threshold, and the second threshold indicates a threshold of the quantity of bits of the feedback bit stream, so that the first device determines the first threshold based on the second threshold and the total quantity of CBGs included in the N TBs.

With reference to the second aspect, in a possible implementation of the second aspect, the communication method further includes: sending, by the second device, third indication information to the first device, where the third indication information indicates that HARQ feedback bits of at least two CBGs in at least one of the N TBs are to be bundled, and the feedback bit stream is obtained by bundling the HARQ feedback bits of the at least two CBGs in the at least one TB based on the third indication information.

With reference to the second aspect, in a possible implementation of the second aspect, N is an integer greater than 1; and the feedback bit stream is obtained by bundling HARQ feedback bits of the CBGs in the N TBs according to at least one of the following priority conditions, the quantity of bits of the feedback bit stream is less than or equal to the third threshold, and the third threshold indicates a threshold of the quantity of bits of the feedback bit stream:

a priority condition 1: determining a priority of a TB based on a service type of the TB;
a priority condition 2: determining a priority of a TB based on a scheduling time of the TB;
a priority condition 3: determining a priority of a TB based on a quantity of CBs included in at least one CBG in the TB; and
a priority condition 4: determining a priority of a TB based on a quantity of CBGs included in the TB.

With reference to the second aspect, in a possible implementation of the second aspect,
the priority condition 1 indicates that a TB with a lower service priority has a higher priority;
the priority condition 2 indicates that a TB with an earlier scheduling time has a higher priority;
the priority condition 3 indicates that a TB with a smaller quantity of CBs included in a CBG has a higher priority; and
the priority condition 4 indicates that a TB with a smaller quantity of included CBGs has a higher priority, or the priority condition 4 indicates that a TB with a larger quantity of included CBGs has a higher priority.

With reference to the second aspect, in a possible implementation of the second aspect, the at least one priority condition includes at least two priority conditions, and there is also an execution sequence priority between the at least two priority conditions.

With reference to the second aspect, in a possible implementation of the second aspect, the at least one priority condition is pre-configured, or is configured by the second device; and when the at least one priority condition includes the at least two priority conditions, the execution sequence priority between the priority conditions is also pre-configured, or is configured by the second device.

With reference to the second aspect, in a possible implementation of the second aspect, the communication method further includes: sending, by the second device, fourth indication information to the first device, where the fourth indication information indicates the third threshold.

According to a third aspect, a terminal device is provided. The terminal device is configured to perform the method according to the first aspect or any possible implementation of the first aspect. Specifically, the terminal device may include a module configured to perform the method according to the first aspect or any possible implementation of the first aspect.

According to a fourth aspect, a terminal device is provided. The terminal device includes a memory and a processor, the memory is configured to store an instruction, the processor is configured to execute the instruction stored in the memory, and execution of the instruction stored in the memory enables the processor to perform the method according to the first aspect or any possible implementation of the first aspect.

According to a fifth aspect, a chip is provided. The chip includes a processing module and a communications interface, the processing module is configured to control the communications interface to communicate externally, and the processing module is further configured to implement the method according to the first aspect or any possible implementation of the first aspect.

Optionally, in an implementation, the chip further includes a storage module, the storage module is configured to store an instruction, the processing module is configured to execute the instruction stored in the memory, and execution of the instruction stored in the storage module enables the processing module to perform the method according to the first aspect or any possible implementation of the first aspect.

According to a sixth aspect, a computer-readable storage medium is provided, and stores a computer program. When the program is executed by a computer, the method according to the first aspect or any possible implementation of the first aspect is implemented. Specifically, the computer may be the foregoing terminal device.

According to a seventh aspect, a computer program product including an instruction is provided. When the instruction is executed by a computer, the method according to the first aspect or any possible implementation of the first aspect is implemented. Specifically, the computer may be the foregoing terminal device.

According to an eighth aspect, a network device is provided. The network device is configured to perform the method according to the second aspect or any possible implementation of the second aspect. Specifically, the network device may include a module used to perform the method according to the second aspect or any possible implementation of the second aspect.

According to a ninth aspect, a network device is provided. The network device includes a memory and a processor, the memory is configured to store an instruction, the processor is configured to execute the instruction stored in the memory, and execution of the instruction stored in the memory enables the processor to perform the method according to the second aspect or any possible implementation of the second aspect.

According to a tenth aspect, a chip is provided. The chip includes a processing module and a communications interface, the processing module is configured to control the communications interface to communicate externally, and the processing module is further configured to implement the method according to the second aspect or any possible implementation of the second aspect.

Optionally, in an implementation, the chip further includes a storage module, the storage module is configured to store an instruction, the processing module is configured to execute the instruction stored in the memory, and execution of the instruction stored in the storage module enables the processing module to perform the method according to the first aspect or any possible implementation of the first aspect.

According to an eleventh aspect, a computer-readable storage medium is provided, and stores a computer program. When the program is executed by a computer, the method according to the second aspect or any possible implementation of the second aspect is implemented. Specifically, the computer may be the foregoing network device.

According to a twelfth aspect, a computer program product including an instruction is provided. When the instruction is executed by a computer, the method according to the second aspect or any possible implementation of the second aspect is implemented. Specifically, the computer may be the foregoing network device.

BRIEF DESCRIPTION OF DRAWINGS

FIG. 13 is a schematic diagram of a Table 1 of a bundling status according to an embodiment of this application.

FIG. 14 is a schematic diagram of a Table 2 of a plurality of TBs according to an embodiment of this application.

FIG. 15 is a schematic diagram of a Table 3 of a bundling status according to priority conditions.

DESCRIPTION OF EMBODIMENTS

The following describes the technical solutions in this application with reference to the accompanying drawings.

Figure 1:
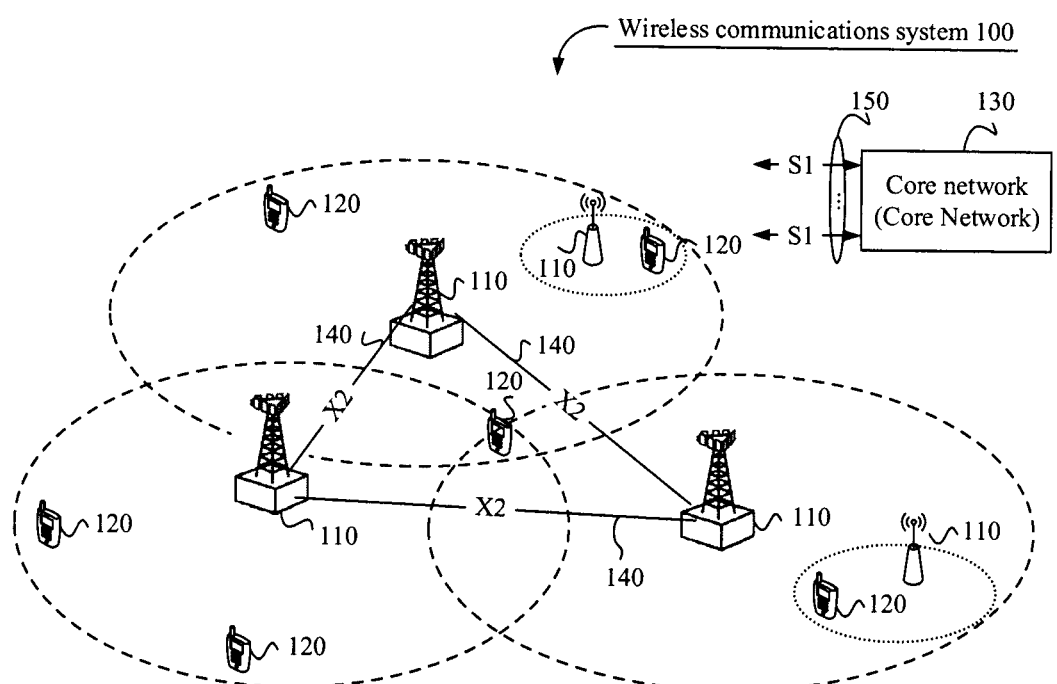
FIG. 1 is a schematic diagram of a wireless communications system according to an embodiment of this application.

FIG. 1 shows a wireless communications system 100 according to this application.

The wireless communications system 100 may work on a high frequency band, is not limited to a long term evolution (Long Term Evolution, LTE) system, or may be a future evolved fifth generation mobile communications (the 5th Generation, 5G) system, a new radio (New Radio, NR) system, a machine to machine (machine to machine, M2M) communications system. As shown in FIG. 1, the wireless communications system 100 may include one or more network devices 110, one or more terminal devices 120, and a core network 130.

The network device 110 may be a base station. The base station may be configured to communicate with one or more terminal devices, or may be configured to communicate with one or more base stations having some terminal functions (for example, communication between a macro base station and a micro base station (such as an access point)). The base station may be a base transceiver station (Base Transceiver Station, BTS) in a time division synchronous code division multiple access (Time Division Synchronous Code Division Multiple Access, TD-SCDMA) system, or may be an evolved nodeB (Evolved NodeB, eNB) in the LTE system, or a base station in the 5G system or the new radio (New Radio, NR) system. In addition, the base station may alternatively be an access point (Access Point, AP), a transmission reception point (Trans Point, TRP), a central unit (Central Unit, CU), or another network entity, and may include some or all functions of the foregoing network entity.

The terminal device 120 may be distributed in the entire wireless communications system 100, and may be static or mobile. In some embodiments of this application, the terminal device 120 may be a mobile device, a mobile station (Mobile Station), a mobile unit (Mobile Unit), an M2M terminal, a radio unit, a remote unit, a user agent, a mobile client, or the like.

Specifically, the network device 110 may be configured to communicate with the terminal device 120 by using one or more antennas under control of a network device controller (not shown in the figure). In some embodiments, the network device controller may be a part of the core network 130, or may be integrated into the network device 110. Specifically, the network device 110 may be configured to transmit control information or user data to the core network 130 through a backhaul (backhaul) interface 150 (for example, an S1 interface). Specifically, the network devices 110 may also communicate with each other directly or indirectly through a backhaul (backhaul) interface 140 (for example, an X2 interface).

The terminal device 120 may communicate with the network device 110 by using a single carrier, or may communicate with the network device 110 by using a plurality of carriers. It should be understood that, when the terminal device 120 is configured with carrier aggregation (Carrier Aggregation, CA), the terminal device 120 may communicate with the network device 110 by using the plurality of carriers.

For example, the terminal device 120 may receive a plurality of TBs from the network device 110 by using the single carrier or the plurality of carriers; and then send a HARQ feedback bit stream (or referred to as HARQ feedback information) of the plurality of TBs on a same uplink control channel.

At an initial stage of formulating the LTE standard, it is specified that maximum bandwidth of one carrier is 20 MHz. In a subsequent standardization process, LTE is further improved, and is referred to as LTE-A. To meet requirements that a downlink peak rate of LTE-A is 1 Gbps and an uplink peak rate of LTE-A is 500 Mbps, maximum transmission bandwidth of 100 MHz needs to be provided. However, because such a large bandwidth contiguous spectrum is scarce, a solution of carrier aggregation is proposed in LTE-A. In the carrier aggregation, two or more component carriers (Component Carrier, CC) are aggregated to support larger transmission bandwidth (maximum bandwidth of 100 MHz). Each CC corresponds to one independent cell (cell). Generally, one CC may be equivalent to one cell. Maximum bandwidth of each CC is 20 MHz.

The wireless communications system shown in FIG. 1 is merely intended to more clearly describe the technical solutions of this application, but constitutes no limitation on this application. A person of ordinary skill in the art may learn that the technical solutions provided in the embodiments of the present invention are also applicable to a similar technical problem as a network architecture evolves and a new service scenario emerges.

To better understand the solutions provided in this application, some terms are first described below.

1. TB

Data sent from a MAC layer to a physical layer is organized in a form of a transport block (Transport Block, TB). One TB corresponds to a data block including one MACPDU. This data block is sent within one TTI, and is also a unit of HARQ retransmission. If UE does not support spatial multiplexing, a maximum of one TB is sent within one TTI. If the UE supports the spatial multiplexing, a maximum of two TBs are sent within one TTI.

Each TB includes a plurality of code block groups (Code Block Group, CBG), and each CBG includes a plurality of code blocks (Code Block, CB). Both a quantity of CBGs included in one TB and a quantity of CBs included in one CBG may be defined based on a specific requirement. This is not limited in this embodiment of this application.

2. Hybrid automatic repeat request (Hybrid Automatic Repeat Request, HARQ).

HARQ is a technology formed by combining forward error correction coding (FEC) with an automatic repeat request (ARQ).

FEC enables a receive end to correct some errors by adding redundant information, thereby reducing a quantity of retransmissions. For an error that cannot be corrected through the FEC, the receive end requests a transmit end to retransmit data by using an ARQ mechanism. The receive end uses an error-detection code, which is usually a CRC check, to detect whether an error occurs in a received data packet. If no error occurs, the receive end sends an acknowledgment (ACK) to the transmit end, and after receiving the ACK, the transmit end sends a next data packet. If an error occurs, the receive end discards the data packet and sends a negative acknowledgment (NACK) to the transmit end, and after receiving the NACK, the transmit end retransmits same data.

The ARQ mechanism uses a manner of discarding a data packet and requesting retransmission. Although these data packets cannot be correctly decoded, useful information is still included in the data packets. If the data packets are discarded, the useful information is lost. By using HARQ with soft combining (HARQ with soft combining), a received erroneous data packet is stored in one HARQ buffer, and is combined with a subsequently received retransmitted data packet, to obtain a more reliable data packet than an independently decoded data packet (a "soft combining" process). Then a data packet obtained through combination is decoded. If decoding still fails, a process of "requesting retransmission, and then performing soft combining" is repeated.

Based on whether retransmitted bit information is the same as that in original transmission, the HARQ with soft combining is classified into two types: chase combining (chase combining) and incremental redundancy (incremental redundancy). Retransmitted bit information in the chase combining is the same as that in original transmission. Retransmitted bit information in the incremental redundancy does not need to be the same as that in original transmission.

In LTE, there is a clear time setting for the HARQ. In an FDD mode, if UE receives downlink data in a subframe n−4, the UE feeds back HARQ-ACK information for the downlink data in a subframe n. In a TDD mode, if UE receives downlink data in a subframe n-k, the UE feeds back HARQ-ACK information for the downlink data in a subframe n, where a value of k may be queried.

Figure 2:
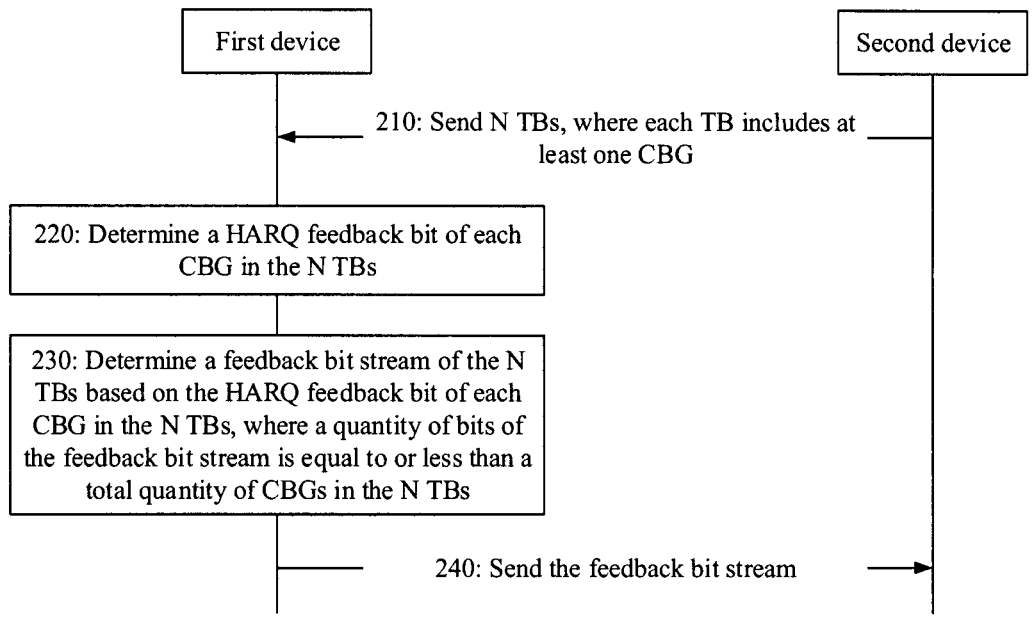
FIG. 2 is a schematic flowchart of a communication method according to an embodiment of this application.

FIG. 2 is a schematic flowchart of a communication method 200 according to an embodiment of this application. For example, a first device and a second device in the communication method 200 are the terminal device 120 and the network device 110 shown in FIG. 1, respectively. As shown in FIG. 2, the communication method 200 includes the following steps.

210: The second device sends N transport blocks (Transport Block, TB) to the first device, where each TB includes at least one code block group (Code Block Group, CBG), and N is a positive integer. Correspondingly, the first device receives the N TBs sent by the second device.

Specifically, each TB includes at least one CBG, and each CBG includes one or more code blocks (Code Block, CB).

It should be understood that both a quantity of CBGs included in one TB and a quantity of CBs included in one CBG may be defined based on a specific requirement. This is not limited in this embodiment of this application.

220: The first device determines a hybrid automatic repeat request HARQ feedback bit of each CBG in the N TBs.

Specifically, if a CBG is successfully received, it is determined that a HAQR feedback bit of the CBG is "1". If a CBG fails to be received, it is determined that a HARQ feedback bit of the CBG is "0".

230: The first device determines a feedback bit stream of the N TBs based on the HARQ feedback bit of each CBG in the N TBs, where a quantity of bits of the feedback bit stream is equal to or less than a total quantity of CBGs in the N TBs.

When the quantity of bits of the feedback bit stream is equal to the total quantity of CBGs in the N TBs, it indicates that the HARQ feedback bit of each CBG in the N TBs directly forms the feedback bit stream of the N TBs.

When the quantity of bits of the feedback bit stream is less than the total quantity of CBGs in the N TBs, it indicates that HARQ feedback bits of two CBGs in the N TBs are bundled (bundling) as one feedback bit, and then the feedback bit stream of the N TBs is formed by the feedback bit obtained after bundling and HARQ feedback bits of a CNG that are not bundled.

Bundling HARQ feedback bits of two CBGs as one feedback bit means performing an "AND" operation on the HARQ feedback bits of the two CBGs to obtain one bit. For example, if a HARQ feedback bit of a CBG1 is "1", and a HARQ feedback bit of a CBG2 is "0", bundling the HARQ feedback bit of the CBG1 and the HARQ feedback bit of the CBG2 means performing an "AND" operation on the bit "1" and the bit "0", to obtain one bit "0".

It should be understood that, bundling HARQ feedback bits of a plurality of CBGs means performing an "AND" operation on the HARQ feedback bits of the plurality of CBGs, to obtain one bit.

For brevity of description, a feedback bit stream is used below to indicate the feedback bit stream of the N TBs.

240: The first device sends the feedback bit stream to the second device.

It should be noted that, in this application, a manner of determining the feedback bit stream is not limited. The feedback bit stream in the N TBs may be obtained directly based on the HARQ feedback bit of each CBG in the N TBs. To be specific, the feedback bit stream is obtained without a bundling operation. Alternatively, HARQ feedback bits of a CBG in the N TBs may be bundled in a bundling manner to obtain the feedback bit stream in the N TBs. For example, the bundling manner is to bundle HARQ feedback bits of every M CBGs in the N TBs as one bit. For another example, the bundling manner is to bundle HARQ feedback bits of only some CBGs in the N TBs to obtain one or more bits. For another example, the bundling manner is to bundle HARQ feedback bits of a CBG in each of the N TBs as one bit.

In the prior art, alternatively, it is specified that a HARQ feedback bit of each CBG is directly fed back, or it is specified that HARQ feedback bits of a CBG in each TB are bundled as one bit, and one bit is fed back for each TB. In other words, in the prior art, the manner of determining the feedback bit stream is fixed.

Therefore, in the solution provided in this application, the feedback bit stream is determined based on the HARQ feedback bit of each CBG in the TBs, but a correspondence between the feedback bit stream and the HARQ feedback bit of each CBG is not limited. Compared with that in the prior art, flexibility of transmitting the feedback bit stream may be improved.

Optionally, in some embodiments, a process of determining the feedback bit stream (step 230 in FIG. 2) specifically includes: selecting a processing manner used to determine the feedback bit stream; and obtaining the feedback bit stream based on the HARQ feedback bit of each CBG in the N TBs in the processing manner.

Specifically, the processing manner is to obtain the feedback bit stream in the N TBs directly based on the HARQ feedback bit of each CBG in the N TBs. Alternatively, the processing manner is to bundle HARQ feedback bits of a CBG in the N TBs in a bundling manner, to obtain the feedback bit stream in the N TBs. In actual application, an appropriate processing manner may be selected based on an actual requirement.

Preferably, in this embodiment, when it is determined that a channel capacity of an uplink channel is sufficient to transmit HARQ feedback bits of all CBGs in the N TBs, the feedback bit stream in the N TBs is formed directly based on the HARQ feedback bit of each CBG in the N TBs. When it is determined that a channel capacity of an uplink channel is insufficient to transmit HARQ feedback bits of all CBGs in the N TBs, HARQ feedback bits of a CBG in the N TBs are bundled in a bundling manner, so that a quantity of bits of a finally obtained feedback bit stream does not exceed the channel capacity of the uplink channel.

It should be understood that an uplink channel allocated to a terminal device by a network device has a channel capacity. In other words, the terminal device can transmit only data whose quantity of bits does not exceed the channel capacity.

In the prior art, a solution of directly feeding back HARQ feedback bits of a CBG may reduce an amount of retransmitted data, but has a relatively high requirement for a channel capacity of an uplink channel. In the prior art, HARQ feedback bits of a CBG in each TB are bundled as one bit. A solution of feeding back one bit for each TB may reduce a requirement for a channel capacity of an uplink channel, but increase an amount of retransmitted data. In other words, in the prior art, reduction in an amount of fed back data and reduction in an amount of retransmitted data cannot be implemented at the same time.

In this embodiment, the quantity of bits of the feedback bit stream of the N TBs can be greater than N and less than the total quantity of CBGs included in the N TBs. Therefore, compared with that in the prior art, the quantity of bits of the feedback bit stream may be reduced to some extent, and a bundling granularity may also be reduced to some extent. In this way, scheduling of the feedback bit stream is more flexible, and an amount of retransmitted data may also be reduced.

Therefore, compared with that in the prior art, the solution provided in this embodiment not only may implement flexible transmission of the feedback bit stream, but also may reduce an amount of retransmitted data as much as possible on the premise of satisfying the channel capacity of the uplink channel. In other words, reduction in an amount of fed back data and reduction in an amount of retransmitted data may be better implemented.

Optionally, in some embodiments, the second device sends the N TBs to the first device by using a single carrier. Correspondingly, the first device receives the N TBs by using the single carrier.

Optionally, in some embodiments, the first device is configured with carrier aggregation (Carrier Aggregation, CA), and the second device sends the N TBs to the first device by using a plurality of carriers. Correspondingly, the first device receives the N TBs by using the plurality of carriers.

For example, the first device receives N1 TBs by using a first carrier, and receives N2 TBs by using a second carrier, where the N1 TBs and the N2 TBs constitute the N TBs.

As shown above, in the solution provided in this application, there are many manners of determining the feedback bit stream based on the HARQ feedback bits of the CBGs in the N TBs. Each manner is described in detail below.

Optionally, in an embodiment, a process of determining the feedback bit stream (step 230 in FIG. 2) specifically includes: determining, by the first device, a first threshold, where the first threshold is greater than 1, and the first threshold indicates that HARQ feedback bits of a CBG whose quantity reaches the first threshold are bundled as one feedback bit; and bundling, by the first device, HARQ feedback bits of the CBGs in the N TBs based on the first threshold, to obtain the feedback bit stream.

Specifically, the first threshold indicates that an "AND" operation is performed on HARQ feedback bits of every X CBGs, to obtain one corresponding bit, where X is equal to the first threshold. It should be understood that the first threshold is an integer greater than 1. It should be understood that if a quantity of remaining CBGs is less than the first threshold, an "AND" operation is performed on HARQ feedback bits of the remaining CBGs to obtain one bit.

The first threshold may also be referred to as a bundling size (Bundling Size) or a bundling granularity (Bundling Granularity).

Optionally, in this embodiment, the N TBs may be received by using a single carrier, or may be received by using a plurality of carriers. This is not limited in this application.

In an optional implementation, a bundling operation based on the first threshold is valid only for HARQ feedback bits of CBGs in a same TB. It may also mean that the bundling operation based on the first threshold is valid only for intra-TB bundling. A process of obtaining the feedback bit stream based on the first threshold includes: bundling, by the first device, HARQ feedback bits of a CBG of each of the N TBs based on the first threshold, to obtain the feedback bit stream, where CBGs corresponding to a same bit in the feedback bit stream belong to a same TB.

A TB of the N TBs is used as an example. HARQ feedback bits of every X CBGs in the TB are bundled as one bit. If a quantity of remaining CBGs are less than X, HARQ feedback bits of the remaining CBGs are bundled as one bit, where X is equal to the first threshold.

Figure 3:
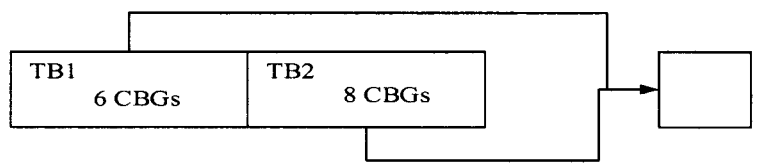
FIG. 3 is a schematic diagram of a bundling operation on a TB according to an embodiment of this application.

Specifically, as shown in FIG. 3, an example in which the N TBs are a TB1 and a TB2 that are received by the first device by using the single carrier is used. The TB1 includes six CBGs and the TB2 includes eight CBGs. It is assumed that the first threshold is equal to 3. A process of forming a feedback bit stream of the two TBs includes: performing an "AND" operation on HARQ feedback bits of every three CBGs in the TB1, to obtain two bits in total; and performing an "AND" operation on HARQ feedback bits of every three CBGs in the TB2, to obtain three bits. It should be understood that a quantity of CBGs included in the TB2 is not a multiple of 3. Therefore, in three bits corresponding to the TB2, two bits are obtained by performing an "AND" operation on three HARQ feedback bits, and one bit is obtained by performing an "AND" operation on two HARQ feedback bits. It should be understood that, in this example, the first device feeds back five bits to the second device, to be specific, a quantity of bits of the feedback bit stream of the two TBs is 5.

It should be understood that FIG. 3 is merely an example but not a limitation. In this implementation, the N TBs may be received by using a single carrier, or may be received by using a plurality of carriers.

In another optional implementation, N is an integer greater than 1, to be specific, the N TBs are at least two TBs. The bundling operation based on the first threshold is valid for both HARQ feedback bits of CBGs in a same TB and HARQ feedback bits of CBGs of different TBs. It may also mean that the bundling operation based on the first threshold is valid for both intra-TB bundling and inter-TB bundling. A process of obtaining the feedback bit stream based on the first threshold includes: bundling, by the first device, HARQ feedback bits of a CBG in the N TBs uniformly based on the first threshold, to obtain the feedback bit stream, where CBGs corresponding to at least one bit in the feedback bit stream belong to different TBs.

In this implementation, CBGs in the N TBs are not differentiated from TBs to which the CBGs respectively belong. In all the CBGs included in the N TBs, an "AND" operation is performed on HARQ feedback bits of every X CBGs, to obtain one corresponding bit.

Figure 4:
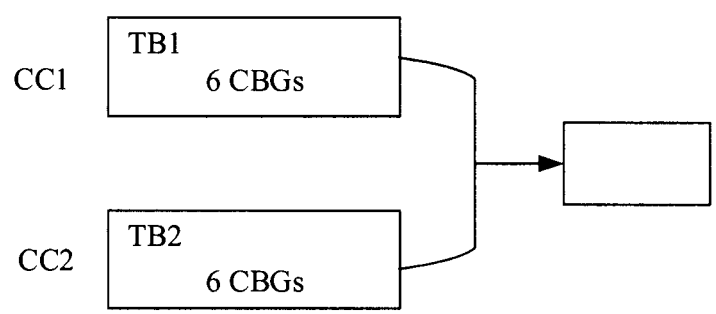
FIG. 4 is another schematic diagram of a bundling operation on a TB according to an embodiment of this application.

Specifically, as shown in FIG. 4, an example in which the N TBs are a TB1 received by the first device by using a first carrier (CC1) and a TB2 received by the first device by using a second carrier (CC2) is used. The TB1 and the TB2 each include six CBGs. It is assumed that the first threshold is 4. A process of forming a feedback bit stream of the two TBs includes: performing an "AND" operation on HARQ feedback bits of every four CBGs of twelve CBGs shown in FIG. 4, to obtain three bits in total. It should be understood that, in this example, the first device feeds back three bits to the second device, to be specific, a quantity of bits of the feedback bit stream of the two TBs is 3.

It should be understood that FIG. 4 is merely an example but not a limitation. In this implementation, the N TBs may be received by using a single carrier, or may be received by using a plurality of carriers.

Specifically, the first threshold may be determined in the following several implementations.

Optionally, in an implementation of determining the first threshold, the first device receives first indication information sent by the second device, where the first indication information indicates the first threshold; and the first device determines the first threshold based on the first indication information.

Specifically, the network device may calculate the first threshold based on a channel capacity of a current uplink channel and the total quantity of CBGs in the N TBs, and then notify the terminal device of the first threshold by using the first indication information.

Optionally, the first indication information may be any one of the following: system information, radio resource control (Radio Resource Control, RRC) signaling, L1 signaling, and L2 signaling.

When the first indication information is L1 signaling, dynamic configuration of the first threshold may be implemented. For example, it is assumed that the N TBs are a TB1 and a TB2, the TB1 includes six CBGs, and the TB2 includes eight CBGs. The second device sends the L1 signaling to the first device, to configure a first threshold of the TB1 to 3 and configure a first threshold of the TB2 to 4. A process of forming a feedback bit stream of the two TBs includes: performing an "AND" operation on HARQ feedback bits of every three CBGs in the TB1, to obtain two bits in total; and performing an "AND" operation on HARQ feedback bits of every four CBGs in the TB2, to obtain two bits. Therefore, in this example, the first device feeds back two bits to the second device, to be specific, a quantity of bits of the feedback bit stream of the two TBs is 4.

It should be understood that the network device dynamically notifies the terminal device of the first threshold by using the L1 signaling and the L2 signaling.

The first threshold may also be referred to as a bundling size (Bundling Size) or a bundling granularity (Bundling Granularity).

Therefore, in this embodiment, scheduling of the feedback bit stream is more flexible by using different bundling sizes or bundling granularities for different TBs.

Optionally, in another implementation of determining the first threshold, the first device determines a second threshold, where the second threshold indicates a threshold of the quantity of bits of the feedback bit stream; and the first device determines the first threshold based on the second threshold and the total quantity of CBGs in the N TBs.

Specifically, a quotient is obtained by dividing the total quantity of CBGs in the N TBs by the second threshold. A minimum integer greater than the quotient is determined as the first threshold.

Specifically, the second threshold is the channel capacity of the uplink channel.

For example, it is assumed that the channel capacity is three bits and the total quantity of CBGs in the N TBs is 12, the first threshold is 12/3=4.

Optionally, the first device receives second indication information sent by the second device, where the second indication information indicates the second threshold; and the second threshold is determined based on the second indication information.

Specifically, the second indication information may be any one of the following: system information, RRC signaling, L1 signaling, and L2 signaling.

Optionally, the first device determines the second threshold based on channel information of an uplink channel used to carry the feedback bit stream.

Specifically, the channel information is information about a quantity of bits carried by the uplink channel. For example, the channel information is a format (format) of the uplink channel. It should be understood that, uplink channels using different formats may carry feedback information of different quantities of bits. For example, if the format used by the uplink channel supports uplink transmission of a maximum of K bits, the channel capacity is K bits. For another example, the channel information indicates a quantity of bits reserved on the uplink channel. For example, an uplink channel using a format may carry 10 bits, but four bits are reserved for sending other control information, and only six bits are used to send the feedback bit stream. In this case, it is determined that the second threshold is six bits.

In this embodiment, the HARQ feedback bits of the CBG in the TBs are bundled based on the first threshold, to obtain the feedback bit stream of the TBs. A value of the first threshold is not limited. Therefore, scheduling of the feedback bit stream is more flexible.

In addition, in this embodiment, the quantity of bits of the feedback bit stream of the N TBs can be greater than N and less than the total quantity of CBGs included in the N TBs. Therefore, compared with that in the prior art, the quantity of bits of the feedback bit stream may be reduced to some extent, and a bundling granularity may also be reduced to some extent. In this way, scheduling of the feedback bit stream is more flexible, and an amount of retransmitted data may also be reduced.

Therefore, compared with that in the prior art, the solution provided in this embodiment not only may implement flexible transmission of the feedback bit stream, but also may reduce an amount of retransmitted data as much as possible on the premise of satisfying the channel capacity of the uplink channel. In other words, reduction in an amount of fed back data and reduction in an amount of retransmitted data may be better implemented.

Optionally, in another embodiment, a process of determining the feedback bit stream (step 230 in FIG. 2) specifically includes: receiving, by the first device, third indication information sent by the second device, where the third indication information indicates that HARQ feedback bits of at least two CBGs in at least one of the N TBs are to be bundled; and bundling, by the first device, the HARQ feedback bits of the at least two CBGs in the at least one TB based on the third indication information, to obtain the feedback bit stream.

It should be understood that, in this embodiment, the first device bundles the HARQ feedback bits of the CBGs in the N TBs based on an indication of the second device, to obtain the feedback bit stream. Therefore, according to the solution provided in this embodiment, the terminal device is enabled to perform any bundling operation under an instruction of the network device, so that scheduling of the feedback bit stream is more flexible.

Figure 5:
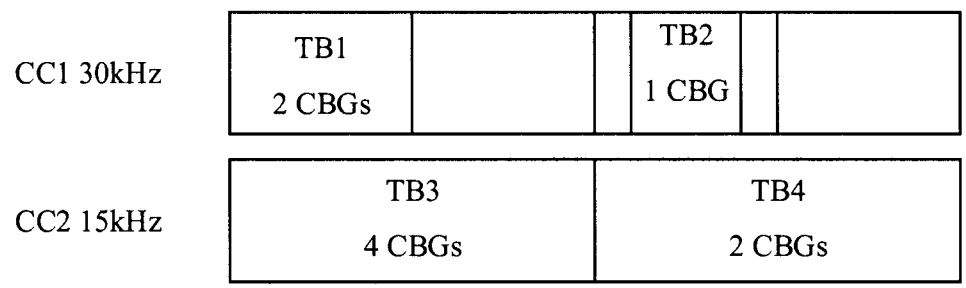
FIG. 5 is another schematic diagram of a bundling operation on a TB according to an embodiment of this application.
Figure 6:
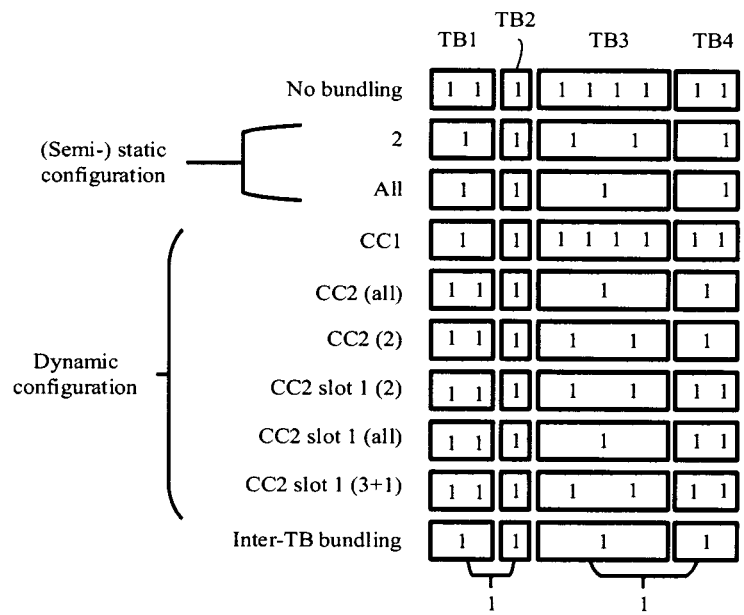
FIG. 6 is another schematic diagram of a bundling operation on a TB according to an embodiment of this application.

With reference to FIG. 5 and FIG. 6, the following describes several examples by using an example in which the first device is UE, the second device is a base station, and the N TBs are four TBs.

As shown in FIG. 5, the UE is configured with CA or intra-band CA, and there are two downlink carriers: a CC1 and a CC2. A subcarrier spacing of the CC2 is half of a subcarrier spacing of the CC1. Four times of downlink transmission are scheduled on the two carriers, including slot-based transmission and mini-slot based transmission. Specifically, the UE receives a TB1 and a TB2 on the CC1, where the TB1 includes two CBGs, and the TB2 includes one CBG. The UE receives a TB3 and a TB4 on the CC2, where the TB3 includes four CBGs, and the TB4 includes two CBGs.

In an example, the base station instructs the UE not to perform a bundling operation. The UE feeds back one HARQ feedback bit of each CBG of the four TBs according to the instruction of the base station. To be specific, a quantity of bits of a feedback bit stream of the four TBs is 9. Specifically, a feedback status is shown in the first row in FIG. 6, and a total of nine bits are fed back.

In another example, the base station statically or semi-statically instructs the UE to perform intra-TB bundling on the four TBs, to bundle HARQ feedback bits of every two CBGs as one bit. According to the instruction of the base station, the UE performs an "AND" operation on HARQ feedback bits of the two CBGs included in the TB1 to obtain one feedback bit, directly uses a HARQ feedback bit of the one CBG included in the TB2 as one feedback bit, performs an "AND" operation on HARQ feedback bits of every two CBGs of the TB3 to obtain two feedback bits, and performs an "AND" operation on HARQ feedback bits of the two CBGs included in the TB4 to obtain one bit. Finally, five feedback bits are obtained. To be specific, a quantity of bits of a feedback bit stream of the four TBs is 5. A feedback status is shown in the second row in FIG. 6.

In another example, the base station statically or semi-statically instructs the UE to perform intra-TB bundling on the four TBs, to bundle HARQ feedback bits of all CBGs included in each TB as one bit. According to the instruction of the base station, the UE performs an "AND" operation on HARQ feedback bits of the two CBGs included in the TB1 to obtain one feedback bit, directly uses a HARQ feedback bit of the one CBG included in the TB2 as one feedback bit, performs an "AND" operation on HARQ feedback bits of the four CBGs included in the TB3 to obtain one feedback bit, and performs an "AND" operation on HARQ feedback bits of the two CBGs included in the TB4 to obtain one bit. Finally, four feedback bits are obtained. To be specific, a quantity of bits of a feedback bit stream of the four TBs is 4. A feedback status is shown in the third row in FIG. 6.

In another example, the base station dynamically instructs the UE to perform intra-TB bundling on only the TB1 and the TB2 that are transmitted on the CC1, to bundle HARQ feedback bits of all CBGs included in each TB as one bit. According to the instruction of the base station, the UE performs an "AND" operation on HARQ feedback bits of the two CBGs included in the TB1 to obtain one feedback bit, directly uses a HARQ feedback bit of the one CBG included in the TB2 as one feedback bit, directly uses HARQ feedback bits of the four CBGs included in the TB3 as four feedback bits, and directly uses HARQ feedback bits of the two CBGs included in the TB4 as two feedback bits. Finally, eight feedback bits are obtained. To be specific, a quantity of bits of a feedback bit stream of the four TBs is 8. A feedback status is shown in the fourth row in FIG. 6.

In another example, the base station dynamically instructs the UE to perform intra-TB bundling on only the TB3 and the TB4 that are transmitted on the CC2, to bundle HARQ feedback bits of all CBGs included in each TB as one bit. According to the instruction of the base station, the UE directly uses HARQ feedback bits of the two CBGs included in the TB1 as two feedback bits, directly uses a HARQ feedback bit of the one CBG included in the TB2 as one feedback bit, performs an "AND" operation on HARQ feedback bits of the four CBGs included in the TB3 to obtain one feedback bit, and performs an "AND" operation on HARQ feedback bits of the two CBGs included in the TB4 to obtain one feedback bit. Finally, five feedback bits are obtained. To be specific, a quantity of bits of a feedback bit stream of the four TBs is 5. A feedback status is shown in the fifth row in FIG. 6.

In another example, the base station dynamically instructs the UE to perform intra-TB bundling on only the TB3 and the TB4 that are transmitted on the CC2, to bundle HARQ feedback bits of every two CBGs as one feedback bit. According to the instruction of the base station, the UE directly uses HARQ feedback bits of the two CBGs included in the TB1 as two feedback bits, directly uses a HARQ feedback bit of the one CBG included in the TB2 as one feedback bit, performs an "AND" operation on HARQ feedback bits of every two CBGs in the TB3 to obtain two feedback bits, and performs an "AND" operation on HARQ feedback bits of the two CBGs included in the TB4 to obtain one feedback bit. Finally, six feedback bits are obtained. To be specific, a quantity of bits of a feedback bit stream of the four TBs is 6. A feedback status is shown in the sixth row in FIG. 6.

In another example, the base station dynamically instructs the UE to perform intra-TB bundling on only the TB3 transmitted in a first slot on the CC2, to bundle HARQ feedback bits of every two CBGs as one feedback bit. According to the instruction of the base station, the UE directly uses HARQ feedback bits of the two CBGs included in the TB1 as two feedback bits, directly uses a HARQ feedback bit of the one CBG included in the TB2 as one feedback bit, performs an "AND" operation on HARQ feedback bits of every two CBGs in the TB3 to obtain two feedback bits, and directly uses HARQ feedback bits of the two CBGs included in the TB4 as two feedback bits. Finally, seven feedback bits are obtained. To be specific, a quantity of bits of a feedback bit stream of the four TBs is 7. A feedback status is shown in the seventh row in FIG. 6.

In another example, the base station dynamically instructs the UE to perform intra-TB bundling on only the TB3 transmitted in a first slot on the CC2, to bundle HARQ feedback bits of all CBGs included in the TB3 as one feedback bit. According to the instruction of the base station, the UE directly uses HARQ feedback bits of the two CBGs included in the TB1 as two feedback bits, directly uses a HARQ feedback bit of the one CBG included in the TB2 as one feedback bit, performs an "AND" operation on the HARQ feedback bits of the four CBGs included in the TB3 to obtain one feedback bit, and directly uses HARQ feedback bits of the two CBGs included in the TB4 as two feedback bits. Finally, six feedback bits are obtained. To be specific, a quantity of bits of a feedback bit stream of the four TBs is 6. A feedback status is shown in the eighth row in FIG. 6.

In another example, the base station dynamically instructs the UE to perform intra-TB bundling on only the TB3 transmitted in a first slot on the CC2, to bundle HARQ feedback bits of the first three CBGs included in the TB3 as one feedback bit. According to the instruction of the base station, the UE directly uses HARQ feedback bits of the two CBGs included in the TB1 as two feedback bits, directly uses a HARQ feedback bit of the one CBG included in the TB2 as one feedback bit, performs an "AND" operation on the HARQ feedback bits of the first three CBGs included in the TB3 to obtain one feedback bit, directly uses a HARQ feedback bit of the fourth CBG included in the TB3 as one feedback bit, and directly uses HARQ feedback bits of the two CBGs included in the TB4 as two feedback bits. Finally, seven feedback bits are obtained. To be specific, a quantity of bits of a feedback bit stream of the four TBs is 7. A feedback status is shown in the ninth row in FIG. 6.

It should be understood that the feedback status shown in the ninth row in FIG. 6 is different from the feedback status shown in the seventh row in FIG. 6.

In another example, the base station instructs the UE to perform intra-TB bundling on the four TBs first, to bundle HARQ feedback bits of all CBGs included in each TB as one bit, and then to separately perform inter-TB bundling on TBs transmitted on the CC1 and TBs transmitted on the CC2. According to the instruction of the base station, the UE performs an "AND" operation on HARQ feedback bits of the two CBGs included in the TB1 to obtain one feedback bit, directly uses a HARQ feedback bit of the one CBG included in the TB2 as one feedback bit, performs an "AND" operation on HARQ feedback bits of the four CBGs included in the TB3 to obtain one feedback bit, and performs an "AND" operation on HARQ feedback bits of the two CBGs included in the TB4 to obtain one bit; and then performs an "AND" operation on the feedback bit of the TB1 and the feedback bit of the TB2 to obtain one feedback bit, and performs an "AND" operation on the feedback bit of the TB3 and the feedback bit of the TB4 to obtain one feedback bit. Finally, two feedback bits are obtained. To be specific, a quantity of bits of a feedback bit stream of the four TBs is 2. A feedback status is shown in the tenth row in FIG. 6.

It should be understood that in the ten examples described with reference to FIG. 6, the related semi-static or static instruction may be implemented by using system information or RRC signaling, and the related dynamic instruction may be implemented by using L1 signaling.

In the foregoing examples described with reference to FIG. 5 and FIG. 6, the slot-based transmission and the mini-slot based transmission are mentioned. The following briefly describes the slot-based transmission and the mini-slot based transmission.

In NR, both the slot (slot)-based and the mini-slot (mini-slot) based transmission are supported. One slot is usually defined as n symbols (symbol), and one mini-slot is defined as 2 to n−1 symbols, where a value of n is usually 7 or 14. The slot-based transmission indicates that a minimum scheduling unit in this transmission is one slot, and the mini-slot based transmission indicates that a minimum scheduling unit may be set to a time unit shorter than one slot (namely, one mini-slot). Generally, the mini-slot based transmission may be used in a scenario in which there is a relatively low latency requirement or a relatively small amount of data needs to be transmitted.

It should be further understood that the foregoing examples described with reference to FIG. 5 and FIG. 6 are merely used as specific examples but not limitations. In actual application, the base station may further instruct the UE to determine the feedback bit stream of the TBs in any other feasible processing manner.

In this embodiment, the feedback bit stream of the TBs is determined according to the instruction of the base station. In this way, the UE may perform a bundling operation in any manner on HARQ feedback bits of the CBG in the TBs under the instruction of the base station, so that scheduling of the feedback bit stream of the TBs is more flexible.

In addition, in this embodiment, the quantity of bits of the feedback bit stream of the N TBs can be greater than N and less than the total quantity of CBGs included in the N TBs. Therefore, compared with that in the prior art, the quantity of bits of the feedback bit stream may be reduced to some extent, and a bundling granularity may also be reduced to some extent. In this way, scheduling of the feedback bit stream is more flexible, and an amount of retransmitted data may also be reduced.

Therefore, compared with that in the prior art, the solution provided in this embodiment not only may implement flexible transmission of the feedback bit stream, but also may reduce an amount of retransmitted data as much as possible on the premise of satisfying the channel capacity of the uplink channel. In other words, reduction in an amount of fed back data and reduction in an amount of retransmitted data may be better implemented.

Optionally, in another embodiment, N is an integer greater than 1 (to be specific, the N TBs are two or more TBs), and a process of determining the feedback bit stream (step 230 in FIG. 2) specifically includes: determining, by the first device, a third threshold, where the third threshold indicates a threshold of the quantity of bits of the feedback bit stream; and bundling, by the first device, the HARQ feedback bits of the CBGs in the N TBs based on a priority of a TB, to obtain the feedback bit stream, where the quantity of bits of the feedback bit stream is less than or equal to the third threshold, and the priority of the TB is determined according to at least one of the following priority conditions 1, 2, 3, and 4.

The priority condition 1 is: determining a priority of a TB based on a service type of the TB.

Specifically, the priority condition 1 indicates that a TB with a lower service priority has a higher priority.

For example, the TB1 belongs to an enhanced mobile broadband (enhanced Mobile Broad Band, eMBB) service, and the TB2 belongs to an ultra-reliable low-latency communication (Ultra Reliable Low Lantency Communication, URLLC) service. A service priority of the URLLC is higher than a service priority of the eMBB. According to the priority condition 1, a priority of the TB1 is higher than a priority of the TB2, to be specific, the TB1 is preferentially bundled relative to the TB2.

The priority condition 2 is: determining a priority of a TB based on a scheduling time of the TB.

Specifically, the priority condition 2 indicates that a TB with an earlier scheduling time has a higher priority.

For example, a scheduling time of the TB1 is earlier than a scheduling time of the TB2. According to the priority condition 2, a priority of the TB1 is higher than a priority of the TB2, to be specific, the TB1 is preferentially bundled relative to the TB2.

The priority condition 3 is: determining a priority of a TB based on a quantity of CBs included in at least one CBG in the TB.

Specifically, the priority condition 3 indicates that a TB with a smaller quantity of CBs included in a CBG has a higher priority.

It should be understood that quantities of CBs included in different CBGs in one TB may be different. Therefore, in the priority condition 3, a priority of a TB may be determined based on an average quantity of CBs included in CBGs in the TB. In a current technology, quantities of CBs included in all CBGs in one TB are usually as close as possible.

For example, if the TB1 includes three CBGs, and quantities of CBs included in the three CBGs are 4, 4, and 4, respectively, an average quantity of CBs included in the CBGs in the TB1 is 4. The TB2 includes four CBGs, and quantities of CBs included in the four CBGs are 2, 4, 4, and 2 respectively. In this case, an average quantity of CBs included in the CBGs in the TB2 is 3. According to the priority condition 3, a priority of the TB2 is higher than a priority of the TB1, to be specific, the TB2 is preferentially bundled relative to the TBL.

The priority condition 4 is: determining a priority of a TB based on a quantity of CBGs included in the TB.

Specifically, the priority condition 4 indicates that a TB with a smaller quantity of included CBGs has a higher priority, or the priority condition 4 indicates that a TB with a larger quantity of included CBGs has a higher priority.

Optionally, the at least one priority condition is preconfigured, or is configured by the second device.

For example, the at least one priority condition is configured on the first device according to a protocol specification. Alternatively, the at least one priority condition is configured on the first device by delivering a message to the first device by the second device.

Specifically, the third threshold mentioned in this embodiment may be a channel capacity of an uplink channel, or the third threshold is less than a channel capacity of an uplink channel.

Optionally, in an implementation of determining the third threshold, the first device receives fourth indication information sent by the second device, where the fourth indication information indicates the third threshold, and the first device determines the third threshold based on the fourth indication information.

Specifically, the fourth indication information may be any one of the following: system information, RRC signaling, L1 signaling, and L2 signaling.

Optionally, in another implementation of determining the third threshold, the first device determines the third threshold based on channel information of an uplink channel used to carry the feedback bit stream.

Specifically, the channel information is information about a quantity of bits carried by the uplink channel. For example, the channel information is a format (format) of the uplink channel. It should be understood that, uplink channels using different formats may carry feedback information of different quantities of bits. For example, if the format used by the uplink channel supports uplink transmission of a maximum of K bits, the channel capacity is K bits. For another example, the channel information indicates a quantity of bits reserved on the uplink channel. For example, an uplink channel using a format may carry 10 bits, but four bits are reserved for sending other control information, and only six bits are used to send the feedback bit stream. In this case, it is determined that the third threshold is six bits.

It should be noted that in this embodiment, a bundling operation on the HARQ feedback bits of the CBGs in the N TBs is a dynamic process. Each time bundling is performed, one bit is subtracted from the feedback bit stream corresponding to the N TBs.

Specifically, an example in which the at least one priority condition is the priority condition 1 is used. It is assumed that the N TBs include a TB1, a TB2, a TB3, and a TB4, and quantities of CBGs included in the TB1, the TB2, the TB3, and the TB4 are 4, 2, 4, and 4 respectively. The TB1, the TB2, and the TB4 belong to an eMBB service, and the TB3 belongs to a URLLC service. According to the priority condition 1, priorities of the TB1, the TB2, and the TB4 are higher than a priority of the TB3, to be specific, the TB1, the TB2, and the TB4 are preferentially bundled relative to the TB3. It is assumed that the third threshold is seven bits. Before bundling is performed, a quantity of bits of a feedback bit stream is 14. It is assumed that the TB1 is bundled first, then the TB2 is bundled, and then the TB4 is bundled, and finally the TB3 is bundled. Bundling on the TB1 is used as an example. In first bundling, four HARQ feedback bits corresponding to the TB1 are bundled as three bits, in second bundling, the three bits are changed into two bits, and in third bundling, the two bits are changed into one bit. When the TB1 corresponds to one feedback bit, a bundling operation on the TB2 starts. For a specific procedure, refer to the bundling operation on the TB1. When the TB2 corresponds to one feedback bit, a bundling operation on the TB4 starts. For a specific procedure, refer to the bundling operation on the TB1. When the TB4 corresponds to one feedback bit, a bundling operation on the TB3 starts. For a specific procedure, refer to the bundling operation on the TB1. In an entire bundling process, each time bundling is performed, it is determined whether a quantity of bits of a current feedback bit stream is equal to 7 (or less than 7). It should be understood that, when the TB4 corresponds to one feedback bit, the bits of the feedback bit stream corresponding to the four TBs is equal to 7, and bundling may be stopped, and then a finally obtained feedback bit stream is reported.

Optionally, in this embodiment, the at least one priority condition includes at least two priority conditions, and there is also an execution sequence priority between the at least two priority conditions. A process of bundling, by the first device, the HARQ feedback bits of the CBGs in the N TBs according to the at least two priority conditions, to obtain the feedback bit stream includes: determining a first level priority sequence of the N TBs according to a first priority condition with a highest priority in the at least two priority conditions; determining, according to the first level priority sequence of the N TBs, that a plurality of TBs of the N TBs belong to a same priority; determining a second level priority sequence of the plurality of N TBs according to a second priority condition with a second highest priority in the at least two priority conditions, and so on; determining priority sequences of at least two levels according to the at least two priority conditions, where the priority sequences of at least two levels include the first level priority sequence and the second level priority sequence; bundling HARQ feedback bits of a CBG in a corresponding TB of the N TBs in turn according to the priority sequences of at least two levels; and stopping bundling until the quantity of bits of the feedback bit stream is equal to or less than the third threshold.

It should be understood that the execution sequence priority between the at least two priority conditions is also pre-configured, or is configured by the second device.

Optionally, in an implementation, in a process of bundling HARQ feedback bits of a CBG in one TB, HARQ feedback bits of a CBG in a next TB are bundled only when the TB corresponds to one feedback bit.

Optionally, in another implementation, in a process of bundling HARQ feedback bits of CBGs in the plurality of TBs, the HARQ feedback bits of the CBGs in the plurality of TBs are bundled in turn according to the second level priority sequence.

In this embodiment, the feedback bit stream of the N TBs is determined based on the HARQ feedback bits of the CBGs in the N TBs and according to a preset priority condition, and an instruction of the network device does not need to be received, so that signaling overheads may be reduced.

In addition, in this embodiment, the quantity of bits of the feedback bit stream of the N TBs can be greater than N and less than the total quantity of CBGs included in the N TBs. Therefore, compared with that in the prior art, the quantity of bits of the feedback bit stream may be reduced to some extent, and a bundling granularity may also be reduced to some extent. In this way, scheduling of the feedback bit stream is more flexible, and an amount of retransmitted data may also be reduced.

Therefore, compared with that in the prior art, the solution provided in this embodiment not only may implement flexible transmission of the feedback bit stream, but also may reduce an amount of retransmitted data as much as possible on the premise of satisfying the channel capacity of the uplink channel. In other words, reduction in an amount of fed back data and reduction in an amount of retransmitted data may be better implemented.

To better understand the solution provided in this embodiment, several examples are described below with reference to FIG. 7 and FIG. 8. In the following examples, an example in which the first device is UE and the second device is a base station is used for description.

Figure 7:
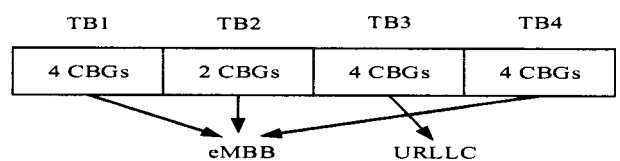
FIG. 7 is another schematic diagram of a bundling operation on a TB according to an embodiment of this application.

In an embodiment, as shown in FIG. 7, four times of downlink transmission are configured for the UE, and HARQ feedback information for the four times of downlink transmission needs to be fed back on a same uplink control channel. In other words, the UE receives four TBs sent by the base station, where a TB1 includes four CBGs, a TB2 includes two CBGs, a TB3 includes four CBGs, and a TB4 includes four CBGs. The TB1, the TB2, and the TB4 belong to an eMBB service, and the TB3 belongs to a URLLC service.

The UE bundles HARQ feedback bits of the CBGs in the four TBs according to a predetermined rule. Specifically, the UE performs a bundling operation according to the following three priority conditions.

A. Determine a priority of a TB based on a priority of a service type of the TB. A TB with a lower service priority has a higher priority.

Specifically, if a priority of the URLLC service is higher than a priority of the eMBB service, a TB that belongs to the eMBB service is preferentially bundled relative to a TB that belongs to the URLLC service. In this example, priorities of the TB1, the TB2, and the TB4 are higher than a priority of the TB3. The TB1, the TB2, and the TB4 each are preferentially bundled relative to the TB3.

B. Determine a priority of a TB based on a quantity of CBGs included in the TB. In this example, a TB with a smaller quantity of included CBGs has a higher priority.

Specifically, a TB with a smaller quantity of included CBGs is preferentially bundled relative to a TB with a larger quantity of included CBGs.

C. Determine a priority of a TB based on a scheduling time of the TB. A TB with an earlier scheduling time has a higher priority.

Specifically, a TB to be scheduled earlier is preferentially bundled relative to a TB to be scheduled later.

It should be understood that there is also an execution sequence priority among the three priority conditions. For example, priorities of the priority conditions A, B, and C are in descending order, or priorities of the priority conditions A, C, and B are in descending order.

For brevity of description, in the following, ">" is used to represent the execution sequence priority among the priority conditions A, B, and C. For example, A>B>C is used to indicate that the priorities of the priority conditions A, B, and C are in descending order, B>C>A is used to indicate that the priorities of the priority conditions B, C, and A are in descending order, and so on.

Specifically, a bundling status is shown in Table 1 in FIG. 13. In Table 1, an example in which the third threshold is a channel capacity of an uplink channel is used. The first column in Table 1 represents a value of the channel capacity. The second column in Table 1 indicates a bundling status of the four TBs when the execution sequence priority of the foregoing three priority conditions is A>B>C. The third column in Table 1 indicates a bundling status of the four TBs when the execution sequence priority of the foregoing three priority conditions is B>C>A. The fifth column in Table 1 indicates a bundling status of the four TBs when the execution sequence priority of the foregoing three priority conditions is C>A>B or C>B>A. The first row other than a row table header in Table 1 indicates a bundling result of the four TBs when the channel capacity is 14 bits or more than 14 bits, that is, a final feedback bit stream corresponding to the four TBs; the second row indicates a bundling result of the four TBs when the channel capacity is 13 bits, that is, a final feedback bit stream corresponding to the four TBs; and so on.

It should be noted that, when performing a bundling operation on HARQ feedback bits of a CBG of one TB, the UE performs a bundling operation on HARQ feedback bits of a CBG in a next TB only when the TB corresponds to one feedback bit.

The following uses an example in which the execution sequence priority of the three priority conditions is A>B>C and the channel capacity is 6, to describe a bundling operation on the four TB2s with reference to Table 1.

Step 1: Determine priorities of the four TBs.

First, priorities (namely, first level priorities) of the TB1, the TB2, the TB3, and the TB4 are determined according to the priority condition A with a highest priority in the three priority conditions. Specifically, according to priorities of service types to which the four TBs respectively belong, it is learned that the priorities of the TB1, the TB2, and the TB4 are higher than the priority of TB3, and the TB1, the TB2, and the TB4 have a same priority, that is, TB1=TB2=TB4>TB3. Then, the priorities (namely, second level priorities) of the TB1, the TB2, and the TB4 are determined according to the priority condition B with a second highest priority in the three priority conditions. Specifically, according to a sequence of scheduling times of the TB1, the TB2, and the TB4, it is learned that the priorities of the TB1, the TB2, and the TB4 are TB2>TB1>TB4. In this way, the priorities of the four TBs are determined as follows: TB2>TB1>TB4>TB3.

Step 2: Bundle HARQ feedback bits of a CBG of a corresponding TB in turn according to the priorities of the four TBs, and stop bundling until a quantity of bits of the feedback bit stream corresponding to the four TBs is equal to the channel capacity (six bits).

The first column (the column in which A>B>C) of the ninth row (the row whose channel capacity is 6) in Table 1 indicates a bundling result of the four TBs, where the TB1 corresponds to one feedback bit, the TB2 corresponds to one feedback bit, the TB3 corresponds to three feedback bits, the TB4 corresponds to one feedback bit, and the quantity of bits of the feedback bit stream corresponding to the four TBs is 6.

The first row to the eighth row in the first column in Table 1 indicate a bundling process of the four TBs. Each time one TB is bundled, a next TB starts to be bundled only when the TB corresponds to one feedback bit.

It can be learned that, in the entire bundling process, bundling is performed on the TB2 once, bundling is performed on the TB1 for three times, bundling is performed on the TB4 for three times, and bundling is performed on the TB3 once. Each time bundling is performed, one bit is subtracted from the quantity of bits of the feedback bit stream corresponding to the four TBs.

It should be understood that different rules are formed when the execution sequence priorities of the priority conditions A, B, and C are different. Under different rules, the priorities of the four TBs are also different. To be specific, bundling sequences of the four TBs are different, as shown in the column in which A>C>B in Table 1.

In this embodiment, the feedback bit stream of the N TBs is determined based on the HARQ feedback bits of the CBGs in the N TBs and according to a preset priority condition, and an instruction of the network device does not need to be received, so that signaling overheads may be reduced.

In addition, in this embodiment, the quantity of bits of the feedback bit stream of the N TBs can be greater than N and less than the total quantity of CBGs included in the N TBs. Therefore, compared with that in the prior art, the quantity of bits of the feedback bit stream may be reduced to some extent, and a bundling granularity may also be reduced to some extent. In this way, scheduling of the feedback bit stream is more flexible, and an amount of retransmitted data may also be reduced.

Therefore, compared with that in the prior art, the solution provided in this embodiment not only may implement flexible transmission of the feedback bit stream, but also may reduce an amount of retransmitted data as much as possible on the premise of satisfying the channel capacity of the uplink channel. In other words, reduction in an amount of fed back data and reduction in an amount of retransmitted data may be better implemented.

In an embodiment, FIG. 7 is still used as an example. The UE receives four TBs sent by the base station, where a TB1 includes four CBGs, a TB2 includes two CBGs, a TB3 includes four CBGs, and a TB4 includes four CBGs. The TB1, the TB2, and the TB4 belong to an eMBB service, and the TB3 belongs to a URLLC service. The UE performs a bundling operation on the four TBs according to the foregoing priority conditions A, B, and C.

A difference from the example shown in Table 1 lies in that, a next TB starts to be bundled not only when one TB corresponds to one feedback bit, but a plurality of TBs are bundled in turn. Details are shown in Table 2 in FIG. 14.

The following still uses an example in which the execution sequence priority of the three priority conditions is A>B>C and the channel capacity is 6, to describe the bundling operation on the four TB2s with reference to Table 2.

Step 1: Determine priorities of the four TBs.

First, priorities (namely, first level priorities) of the TB1, the TB2, the TB3, and the TB4 are determined according to the priority condition A with a highest priority in the three priority conditions. Specifically, according to priorities of service types to which the four TBs respectively belong, it is learned that the priorities of the TB1, the TB2, and the TB4 are higher than the priority of TB3, and the TB1, the TB2, and the TB4 have a same priority, that is, TB1=TB2=TB4>TB3. Then, the priorities (namely, second level priorities) of the TB1, the TB2, and the TB4 are determined according to the priority condition B with a second highest priority in the three priority conditions. Specifically, according to a sequence of scheduling times of the TB1, the TB2, and the TB4, it is learned that the priorities of the TB1, the TB2, and the TB4 are TB2>TB1>TB4. In this way, the priorities of the four TBs are determined as follows: TB2>TB1>TB4>TB3.

Step 2: Bundle HARQ feedback bits of a CBG of a corresponding TB in turn according to the priorities of the four TBs, and stop bundling until a quantity of bits of a feedback bit stream corresponding to the four TBs is equal to the channel capacity (six bits).

The first column (the column in which A>B>C) of the ninth row (the row whose channel capacity is 6) in Table 2 indicates a bundling result of the four TBs, where the TB1 corresponds to one feedback bit, the TB2 corresponds to one feedback bit, the TB3 corresponds to three feedback bits, the TB4 corresponds to one feedback bit, and the quantity of bits of the feedback bit stream corresponding to the four TBs is 6.

The first row to the eighth row in the first column in Table 2 indicate a bundling process of the four TBs. It can be learned from the second row to the eighth row that the TB1, the TB2, and the TB4 are bundled in turn in a TB2>TB1>TB4 sequence.

It can be learned that, in the entire bundling process, bundling is performed on the TB2 once, bundling is performed on the TB1 for three times, bundling is performed on the TB4 for three times, and bundling is performed on the TB3 once. Each time bundling is performed, one bit is subtracted from the quantity of bits of the feedback bit stream corresponding to the four TBs.

It should be understood that different rules are formed when the execution sequence priorities of the priority conditions A, B, and C are different. Under different rules, the priorities of the four TBs are also different. To be specific, bundling sequences of the four TBs are different, as shown in the column in which A>C>B in Table 1.

In this embodiment, the feedback bit stream of the N TBs is determined based on the HARQ feedback bits of the CBGs in the N TBs and according to a preset priority condition, and an instruction of the network device does not need to be received, so that signaling overheads may be reduced.

In addition, in this embodiment, the quantity of bits of the feedback bit stream of the N TBs can be greater than N and less than the total quantity of CBGs included in the N TBs. Therefore, compared with that in the prior art, the quantity of bits of the feedback bit stream may be reduced to some extent, and a bundling granularity may also be reduced to some extent. In this way, scheduling of the feedback bit stream is more flexible, and an amount of retransmitted data may also be reduced.

Therefore, compared with that in the prior art, the solution provided in this embodiment not only may implement flexible transmission of the feedback bit stream, but also may reduce an amount of retransmitted data as much as possible on the premise of satisfying the channel capacity of the uplink channel. In other words, reduction in an amount of fed back data and reduction in an amount of retransmitted data may be better implemented.

Figure 8:
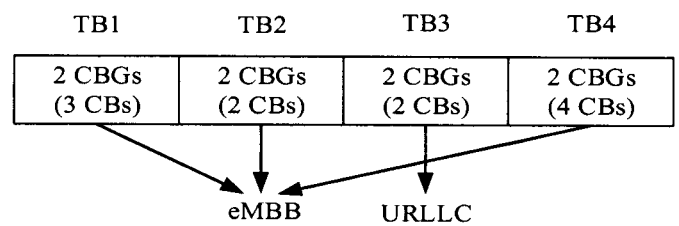
FIG. 8 is another schematic diagram of a bundling operation on a TB according to an embodiment of this application.

In another example, as shown in FIG. 8, four times of downlink transmission are configured for one UE, and HARQ-ACK information needs to be fed back on a same uplink control channel. The first, the second, and the fourth transmitted TBs belong to an eMBB service, and the third transmitted TB belongs to a URLLC service. A quantity of CBGs in each transmitted TB is 2. Average quantities of CBs included in the CBGs in the TBs are 3, 2, 2, and 4, respectively.

The UE performs a bundling operation according to the following two priority conditions.

A. Determine a priority of a TB based on a priority of a service type of the TB. A TB with a lower service priority has a higher priority.

Specifically, if a priority of the URLLC service is higher than a priority of the eMBB service, a TB that belongs to the eMBB service is preferentially bundled relative to a TB that belongs to the URLLC service. In this example, priorities of a TB1, a TB2, and a TB4 are higher than a priority of a TB3. The TB1, the TB2, and the TB4 each are preferentially bundled relative to the TB3.

D. Determine a priority of a TB based on a quantity of CBs included in at least one CBG in the TB.

A TB with a smaller quantity of CBs included in a CBG has a higher priority.

It should be understood that quantities of CBs included in different CBGs in one TB may be different. Therefore, in the priority condition 3, a priority of a TB may be determined based on an average quantity of CBs included in CBGs in the TB. In a current technology, quantities of CBs included in CBGs in one TB are usually as close as possible.

For example, if the TB1 includes three CBGs, and quantities of CBs included in the three CBGs are 4, 4, and 4 respectively, an average quantity of CBs included in the CBGs in the TB1 is 4. The TB2 includes four CBGs, and quantities of CBs included in the four CBGs are 2, 4, 4, and 2 respectively. In this case, an average quantity of CBs included in the CBGs in the TB2 is 3. According to the priority condition 3, a priority of the TB2 is higher than a priority of the TB1, to be specific, the TB2 is preferentially bundled relative to the TB1.

Intra-TB bundling is performed on each TB, and a plurality of TBs are bundled in turn. Using FIG. 8 as an example, a bundling status according to the priority conditions A and D is shown in Table 3 in FIG. 15.

In this embodiment, the feedback bit stream of the N TBs is determined based on the HARQ feedback bits of the CBGs in the N TBs and according to a preset priority condition, and an instruction of the network device does not need to be received, so that signaling overheads may be reduced.

In addition, in this embodiment, the quantity of bits of the feedback bit stream of the N TBs can be greater than N and less than the total quantity of CBGs included in the N TBs. Therefore, compared with that in the prior art, the quantity of bits of the feedback bit stream may be reduced to some extent, and a bundling granularity may also be reduced to some extent. In this way, scheduling of the feedback bit stream is more flexible, and an amount of retransmitted data may also be reduced.

Therefore, compared with that in the prior art, the solution provided in this embodiment not only may implement flexible transmission of the feedback bit stream, but also may reduce an amount of retransmitted data as much as possible on the premise of satisfying the channel capacity of the uplink channel. In other words, reduction in an amount of fed back data and reduction in an amount of retransmitted data may be better implemented.

Optionally, in some embodiments, each CBG includes only one CB.

In this embodiment, a CBG and a CB may be considered to be equivalent, and the solution about the CBG in the foregoing embodiments is also applicable to the CB.

It should be understood that FIG. 3 to FIG. 8 and Table 1 to Table 3 are merely used as specific examples but not limitations. In actual application, based on a quantity of CBGs actually included in a TB, under the teachings of the embodiments provided in this specification, other feasible processing manners may be figured out, to obtain a feedback bit stream of the TB. These solutions also fall within the protection scope of this application.

The foregoing describes the communication method provided in the embodiments of this application, and the following describes a communications device provided in the embodiments of this application.

Figure 9:
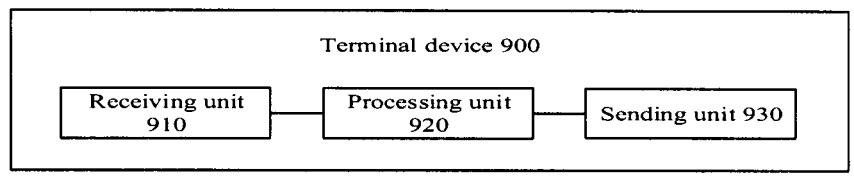
FIG. 9 is a schematic block diagram of a terminal device according to an embodiment of this application.

FIG. 9 is a schematic block diagram of a terminal device 900 according to an embodiment of this application. The terminal device 900 includes:

a receiving unit 910, configured to receive N transport blocks TBs sent by a second device, where each TB includes at least one code block group CBG, and N is a positive integer;

a processing unit 920, configured to determine a HARQ feedback bit of each CBG in the N Tbs, where the processing unit 920 is further configured to determine a feedback bit stream of the N TBs based on the HARQ feedback bit of each CBG in the N TBs, where a quantity of bits of the feedback bit stream is equal to or less than a total quantity of CBGs in the N TBs; and a sending unit 930, configured to send the feedback bit stream to the second device.

In the solution provided in this application, the feedback bit stream is determined based on the HARQ feedback bit of each CBG in the TBs, but a correspondence between the feedback bit stream and the HARQ feedback bit of each CBG is not limited. Compared with that in the prior art, flexibility of transmitting the feedback bit stream may be improved.

Optionally, in an embodiment, the processing unit 920 is specifically configured to: determine a first threshold, where the first threshold indicates that HARQ feedback bits of a CBG whose quantity reaches the first threshold are bundled as one feedback bit; and bundle the HARQ feedback bits of the CBGs in the N TBs based on the first threshold, to obtain the feedback bit stream.

Optionally, in an embodiment, the processing unit 920 is specifically configured to bundle HARQ feedback bits of a CBG of each TB of the N TBs based on the first threshold, to obtain the feedback bit stream, where CBGs corresponding to a same bit in the feedback bit stream belong to a same TB.

Optionally, in an embodiment, N is an integer greater than 1; and the processing unit 920 is specifically configured to: bundle the HARQ feedback bits of the CBGs in the N TBs uniformly based on the first threshold, to obtain the feedback bit stream, where CBGs corresponding to at least one bit in the feedback bit stream belong to different TBs.

Optionally, in an embodiment, the receiving unit 910 is further configured to receive first indication information sent by the second device, where the first indication information indicates the first threshold. The processing unit 920 is configured to determine the first threshold based on the first indication information.

Optionally, in an embodiment, the processing unit 920 is specifically configured to: determine a second threshold, where the second threshold indicates a threshold of the quantity of bits of the feedback bit stream; and determine the first threshold based on the second threshold and the total quantity of CBGs in the N TBs.

Optionally, in an embodiment, the receiving unit 910 is further configured to receive second indication information sent by the second device, where the second indication information indicates the second threshold. The processing unit 920 is configured to determine the second threshold based on the second indication information; or the processing unit 920 is configured to determine the second threshold based on channel information of an uplink channel used to carry the feedback bit stream.

Optionally, in an embodiment, the receiving unit 910 is further configured to receive third indication information sent by the second device, where the third indication information indicates that HARQ feedback bits of at least two CBGs in at least one of the N TBs are to be bundled; and the processing unit 920 is configured to bundle the HARQ feedback bits of the at least two CBGs in the at least one TB based on the third indication information, to obtain the feedback bit stream.

Optionally, in an embodiment, N is an integer greater than 1; and the processing unit 920 is configured to: determine a third threshold, where the third threshold indicates a threshold of the quantity of bits of the feedback bit stream; and bundle the HARQ feedback bits of the CBGs in the N TBs based on a priority of a TB, to obtain the feedback bit stream, where the quantity of bits of the feedback bit stream is less than or equal to the third threshold, and the priority of the TB is determined according to at least one of the following priority conditions:

a priority condition 1: determining a priority of a TB based on a service type of the TB;

a priority condition 2: determining a priority of a TB based on a scheduling time of the TB;

a priority condition 3: determining a priority of a TB based on a quantity of CBs included in at least one CBG in the TB; and a priority condition 4: determining a priority of a TB based on a quantity of CBGs included in the TB.

Optionally, in an embodiment, the priority condition 1 indicates that a TB with a lower service priority has a higher priority;

the priority condition 2 indicates that a TB with an earlier scheduling time has a higher priority;

the priority condition 3 indicates that a TB with a smaller quantity of CBs included in a CBG has a higher priority; and the priority condition 4 indicates that a TB with a smaller quantity of included CBGs has a higher priority, or the priority condition 4 indicates that a TB with a larger quantity of included CBGs has a higher priority.

Optionally, in this embodiment, the at least one priority condition includes at least two priority conditions, and there is also an execution sequence priority between the at least two priority conditions.

Optionally, in an implementation, the processing unit 920 is configured to: in a process of bundling HARQ feedback bits of a CBG in one TB, bundle HARQ feedback bits of a CBG in a next TB only when the TB corresponds to one feedback bit.

Optionally, in an embodiment, the processing unit 920 is configured to: in a process of bundling HARQ feedback bits of CBGs in the plurality of TBs, bundle the HARQ feedback bits of the CBGs in the plurality of TBs in turn.

Optionally, in an embodiment, the at least one priority condition is pre-configured, or is configured by the second device; and when the at least one priority condition includes the at least two priority conditions, the execution sequence priority between the priority conditions is also pre-configured, or is configured by the second device.

Optionally, in an embodiment, the receiving unit 910 is further configured to receive fourth indication information sent by the second device, where the fourth indication information indicates the third threshold. The processing unit 920 is configured to determine the third threshold based on the fourth indication information; or the processing unit 920 is configured to determine the third threshold based on channel information of an uplink channel used to carry the feedback bit stream.

It should be understood that the processing unit 720 may be implemented by using a processor or a processor-related circuit component. The receiving unit 710 may be implemented by using a receiver or a receiver-related circuit component. The sending unit 730 may be implemented by using a transmitter or a transmitter-related circuit component.

Figure 10:
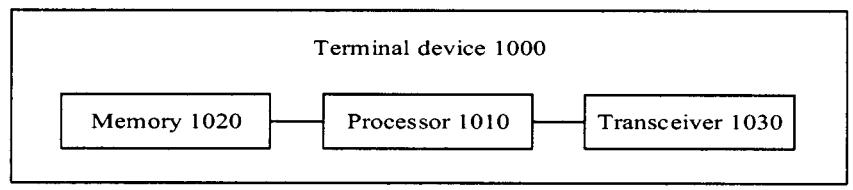
FIG. 10 is another schematic block diagram of a terminal device according to an embodiment of this application.

As shown in FIG. 10, an embodiment of this application further provides a terminal device 1000. The terminal device 1000 includes a processor 1010, a memory 1020, and a transceiver 1030. The memory 1020 is configured to store an instruction (or a computer program). The processor 1010 is configured to execute the instruction stored in the memory 1020. The processor 1010 is further configured to control the transceiver 1030 to receive or send a signal. When the instruction stored in the memory 1020 is executed, the transceiver 1030 is configured to perform operations performed by the receiving unit 910 and the sending unit 930 in the foregoing embodiment, and the processor 1010 is configured to perform an operation performed by the processing unit 920 in the foregoing embodiment.

It should be understood that the terminal device 900 or the terminal device 1000 provided in the embodiments of this application may correspond to the first device in the foregoing method embodiment. Each unit in the terminal device 900 or the terminal device 1000 is also configured to perform a related operation in the foregoing method embodiment. For details, refer to the foregoing description. Details are not described herein.

Figure 11:
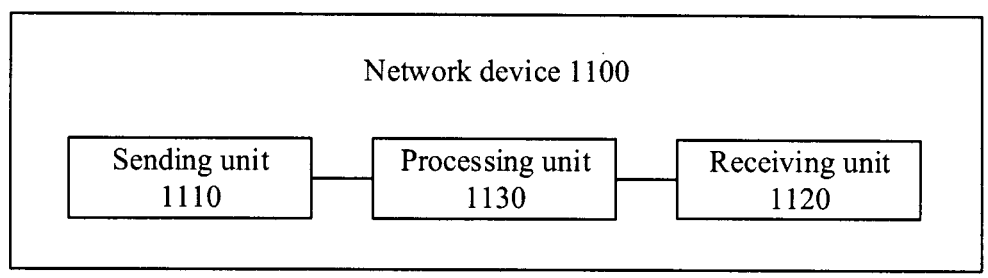
FIG. 11 is a schematic block diagram of a network device according to an embodiment of this application.

FIG. 11 is a schematic block diagram of a network device 1100 according to an embodiment of this application. The network device 1100 includes:

a sending unit 1110, configured to send N transport blocks TBs to a first device, where each TB includes at least one code block group CBG, and N is a positive integer; and a receiving unit 1120, configured to receive a feedback bit stream sent by the first device, where the feedback bit stream is determined based on a hybrid automatic repeat request HARQ feedback bit of a CBG in the N TBs, and a quantity of bits of the feedback bit stream is less than or equal to a total quantity of CBGs in the N TBs.

It should be understood that the network device 1100 further includes a processing unit 1130, configured to control the sending unit 1100 to send a signal and control the receiving unit 1120 to receive a signal.

In the solution provided in this application, the feedback bit stream is determined based on the HARQ feedback bit of each CBG in the TBs, but a correspondence between the feedback bit stream and the HARQ feedback bit of each CBG is not limited. Compared with that in the prior art, flexibility of transmitting the feedback bit stream may be improved.

Optionally, in an embodiment, the feedback bit stream is obtained by bundling HARQ feedback bits of the CBGs in the N TBs based on a first threshold, and the first threshold indicates that HARQ feedback bits of a CBG whose quantity reaches the first threshold are bundled as one feedback bit.

Optionally, in an embodiment, CBGs corresponding to a same bit in the feedback bit stream belong to a same TB; or CBGs corresponding to at least one bit in the feedback bit stream belong to different TBs.

Optionally, in an embodiment, the sending unit 1110 is further configured to send first indication information to the first device, where the first indication information indicates the first threshold; or the sending unit 1110 is further configured to send second indication information to the first device, where the second indication information indicates a second threshold, and the second threshold indicates a threshold of the quantity of bits of the feedback bit stream, so that the first device determines the first threshold based on the second threshold and the total quantity of CBGs included in the N TBs.

Optionally, in an embodiment, the sending unit 1110 is further configured to send third indication information to the first device, where the third indication information indicates that HARQ feedback bits of at least two CBGs in at least one of the N TBs are to be bundled. The feedback bit stream is obtained by bundling the HARQ feedback bits of the at least two CBGs in the at least one TB based on the third indication information.

Optionally, in an embodiment, N is an integer greater than 1; and the feedback bit stream is obtained by bundling HARQ feedback bits of the CBGs in the N TBs according to at least one of the following priority conditions, the quantity of bits of the feedback bit stream is less than or equal to the third threshold, and the third threshold indicates a threshold of the quantity of bits of the feedback bit stream:

a priority condition 1: determining a priority of a TB based on a service type of the TB;

a priority condition 2: determining a priority of a TB based on a scheduling time of the TB;

a priority condition 3: determining a priority of a TB based on a quantity of CBs included in at least one CBG in the TB; and a priority condition 4: determining a priority of a TB based on a quantity of CBGs included in the TB.

Optionally, in an embodiment, the priority condition 1 indicates that a TB with a lower service priority has a higher priority;

the priority condition 2 indicates that a TB with an earlier scheduling time has a higher priority;

the priority condition 3 indicates that a TB with a smaller quantity of CBs included in a CBG has a higher priority; and the priority condition 4 indicates that a TB with a smaller quantity of included CBGs has a higher priority, or the priority condition 4 indicates that a TB with a larger quantity of included CBGs has a higher priority.

Optionally, in this embodiment, the at least one priority condition includes at least two priority conditions, and there is also an execution sequence priority between the at least two priority conditions.

Optionally, in an embodiment, the at least one priority condition is pre-configured, or is configured by the network device.

When the at least one priority condition includes the at least two priority conditions, the execution sequence priority between the priority conditions is also pre-configured, or is configured by the network device.

Optionally, in an embodiment, the sending unit 1110 is further configured to send fourth indication information to the first device, where the fourth indication information indicates the third threshold.

It should be understood that the processing unit 1130 may be implemented by using a processor or a processor-related circuit component. The receiving unit 1120 may be implemented by using a receiver or a receiver-related circuit component. The sending unit 1110 may be implemented by using a transmitter or a transmitter-related circuit component.

Figure 12:
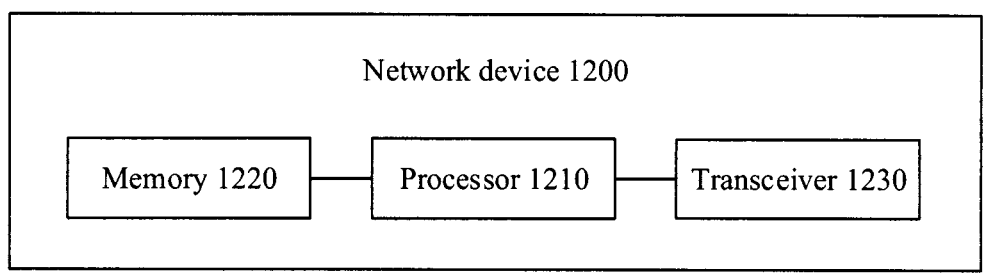
FIG. 12 is another schematic block diagram of a network device according to an embodiment of this application.

As shown in FIG. 12, an embodiment of this application further provides a network device 1200. The network device 1200 includes a processor 1210, a memory 1220, and a transceiver 1230. The memory 1220 is configured to store an instruction (or a computer program). The processor 1210 is configured to execute the instruction stored in the memory 1220. The processor 1210 is further configured to control the transceiver 1230 to receive or send a signal. When the instruction stored in the memory 1220 is executed, the transceiver 1230 is configured to perform operations performed by the sending unit 1110 and the receiving unit 1120 in the foregoing embodiment, and the processor 1210 is configured to perform an operation performed by the processing unit 1130 in the foregoing embodiment.

It should be understood that the network device 1100 or the network device 1200 provided in the embodiments of this application may correspond to the second device in the foregoing method embodiment. Each unit in the network device 1100 or the network device 1200 is further configured to perform a related operation in the foregoing method embodiment. For details, refer to the foregoing description. Details are not described herein.

An embodiment of this application further provides a chip. The chip includes a processing unit and a communications interface. The processing unit is configured to perform an operation performed by the first device side in the foregoing method embodiment, and the communications interface is configured to communicate externally.

Optionally, the chip may further include a storage unit, and the storage unit stores an instruction. The processing unit is configured to execute the instruction stored in the storage unit. When executing the instruction, the processing unit is configured to perform an operation performed by the terminal device side in the foregoing method embodiment.

An embodiment of this application further provides a chip. The chip includes a processing unit and a communications interface. The processing unit is configured to perform an operation performed by the second device in the foregoing method embodiment, and the communications interface is configured to communicate externally.

Optionally, the chip may further include a storage unit, and the storage unit stores an instruction. The processing unit is configured to execute the instruction stored in the storage unit. When executing the instruction, the processing unit is configured to perform an operation performed by the network device in the foregoing method embodiment.

An embodiment of this application further provides a computer-readable storage medium that stores a computer program. When the computer program is executed by a processor, the method on the first device side in the foregoing method embodiment may be implemented.

An embodiment of this application further provides a computer-readable storage medium that stores a computer program. When the computer program is executed by a processor, the method on the second device side in the foregoing method embodiment may be implemented.

An embodiment of this application further provides a computer program product including an instruction. When the instruction is executed by a computer, the method on the first device side in the foregoing method embodiment may be implemented.

An embodiment of this application further provides a computer program product including an instruction. When the instruction is executed by a computer, the method on the second device side in the foregoing method embodiment may be implemented.

For explanations and beneficial effects of related content in any one of the foregoing provided communications apparatuses, refer to the corresponding method embodiment provided above. Details are not described herein.

It should be understood that, the processor mentioned in the embodiments of the present invention may be a central processing unit (Central Processing Unit, CPU), or may be another general-purpose processor, a digital signal processor (Digital Signal Processor, DSP), an application specific integrated circuit (Application Specific Integrated Circuit, ASIC), a field programmable gate array (Field Programmable Gate Array, FPGA) or another programmable logic device, a discrete gate or transistor logical device, a discrete hardware component, or the like. The general-purpose processor may be a microprocessor, or the processor may be any conventional processor or the like.

It should be further understood that the memory mentioned in the embodiments of the present invention may be a volatile memory or a nonvolatile memory, or may include a volatile memory and a nonvolatile memory. The nonvolatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), used as an external cache. Through example but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM).

It should be noted that, when the processor is a general-purpose processor, a DSP, an ASIC, an FPGA, or another programmable logic device, a discrete gate or a transistor logical device, or a discrete hardware component, the memory (a storage module) is integrated into the processor.

It should be noted that the memory described in this specification aims to include but is not limited to these memories and any memory of another proper type.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that for the purpose of convenient and brief description, for a detailed working process of the described system, apparatus, and unit, refer to a corresponding process in the foregoing method embodiments. Details are not described herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings, direct couplings, or communication connections may be implemented through some interfaces. Indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, implemented by a first device, comprising:
   receiving N transport blocks (TBs) from a second device, wherein each TB comprises at least one code block group (CBG), and wherein N is a positive integer;
   determining a hybrid automatic repeat request (HARQ) feedback bit of each CBG in the N TBs;
   determining a feedback bit stream of the N TBs based on the HARQ feedback bit of each CBG in the N TBs, wherein a quantity of bits of the feedback bit stream is equal to or less than a total quantity of CBGs in the N TBs, and wherein the feedback bit stream of the N TBs is determined by:
      determining a first threshold, wherein the first threshold indicates that HARQ feedback bits of a CBG whose quantity reaches the first threshold are bundled as one feedback bit, wherein the first threshold is determined by receiving first indication information from the second device, and wherein the first indication information indicates the first threshold; and
      bundling HARQ feedback bits of the CBGs in the N TBs based on the first threshold to obtain the feedback bit stream; and
   sending the feedback bit stream to the second device.

2. The communication method of claim 1, wherein bundling the HARQ feedback bits of the CBGs in the N TBs based on the first threshold to obtain the feedback bit stream comprises bundling the HARQ feedback bits of a CBG of each of the N TBs based on the first threshold to obtain the feedback bit stream, and wherein CBGs corresponding to a same bit in the feedback bit stream belong to a same TB.

3. The communication method of claim 1, wherein N is an integer greater than 1, wherein bundling the HARQ feedback bits of the CBGs in the N TBs based on the first threshold to obtain the feedback bit stream comprises bundling the HARQ feedback bits of the CBGs in the N TBs uniformly based on the first threshold to obtain the feedback bit stream, and wherein CBGs corresponding to at least one bit in the feedback bit stream belong to different TBs.

4. The communication method of claim 1, wherein determining the feedback bit stream of the N TBs based on the HARQ feedback bit of each CBG in the N TBs further comprises:
   receiving third indication information from the second device, wherein the third indication information indicates that HARQ feedback bits of at least two CBGs in at least one of the N TBs are to be bundled; and
   bundling the HARQ feedback bits of the at least two CBGs in the at least one TB based on the third indication information to obtain the feedback bit stream.

5. The communication method of claim 1, wherein determining the feedback bit stream of the N TBs based on the HARQ feedback bit of each CBG in the N TBs further comprises:
   determining a third threshold, wherein the third threshold indicates a threshold of the quantity of bits of the feedback bit stream;
   bundling the HARQ feedback bits of the CBGs in the N TBs based on a priority of a TB to obtain the feedback bit stream, wherein the quantity of bits of the feedback bit stream is less than or equal to the third threshold; and determining that the priority of the TB is based on a priority condition, wherein the priority condition comprises at least one of determining a priority of a TB based on a service type of the TB, determining a priority of a TB based on a scheduling time of the TB, determining a priority of a TB based on a quantity of code blocks comprised in at least one CBG in the TB, or determining a priority of a TB based on a quantity of CBGs comprised in the TB.

6. The communication method of claim 5, wherein determining the priority of the TB based on the priority condition comprises determining that a TB with a lower service priority has a higher priority, a TB with an earlier scheduling time has a higher priority, a TB with a smaller quantity of code blocks comprised in a CBG having a higher priority, a TB with a smaller quantity of comprised CBGs having a higher priority, or a TB with a larger quantity of comprised CBGs having a higher priority.

7. The communication method of claim 5, wherein the priority condition comprises at least two priority conditions, wherein an execution sequence priority is between the at least two priority conditions, and wherein the execution sequence priority between the priority conditions is preconfigured or is configured by the second device.

8. The communication method of claim 7, wherein bundling the HARQ feedback bits further comprises:
bundling HARQ feedback bits of a CBG in a next TB when the TB corresponds to one feedback bit; or
bundling the HARQ feedback bits of the CBGs in the TBs in turn.

9. A communication method, implemented by a second device, comprising:
sending N transport blocks (TBs) to a first device, wherein each TB comprises at least one code block group (CBG), and wherein N is a positive integer;
receiving a feedback bit stream from the first device, wherein the feedback bit stream is based on a hybrid automatic repeat request (HARQ) feedback bit of a CBG in the N TBs, and wherein a quantity of bits of the feedback bit stream is less than or equal to a total quantity of CBGs in the N TBs;
bundling HARQ feedback bits of the CBG in the N TBs; and
obtaining the feedback bit in response to bundling the HARQ feedback bits of the CBGs in the N TBs based on a first threshold, wherein the first threshold indicates that HARQ feedback bits of a CBG whose quantity reaches the first threshold are bundled as one feedback bit, and wherein either CBGs corresponding to a same bit in the feedback bit stream belong to a same TB or the CBGs corresponding to at least one bit in the feedback bit stream belong to different TBs.

10. The communication method of claim 9, further comprising:
sending first indication information to the first device, wherein the first indication information indicates the first threshold; or
sending second indication information to the first device, wherein the second indication information indicates a second threshold, and wherein the second threshold indicates a threshold of the quantity of bits of the feedback bit stream such that the first device is able to determine the first threshold based on the second threshold and the total quantity of CBGs comprised in the N TBs.

11. The communication method of claim 9, further comprising:
sending third indication information to the first device, wherein the third indication information indicates that HARQ feedback bits of at least two CBGs in at least one of the N TBs are to be bundled; and
obtaining the feedback bit in response to bundling the HARQ feedback bits of the at least two CBGs in the at least one TB based on the third indication information.

12. The communication method of claim 9, wherein N is an integer greater than 1, wherein the quantity of bits of the feedback bit stream is less than or equal to a third threshold, wherein the third threshold indicates a threshold of the quantity of bits of the feedback bit stream, wherein the communication method further comprises obtaining the feedback bit stream in response to bundling the HARQ feedback bits of the CBGs in the N TBs according to at least one priority condition, and wherein the at least one priority condition comprises determining a priority of a TB based on a service type of the TB, determining a priority of a TB based on a scheduling time of the TB, determining a priority of a TB based on a quantity of code blocks comprised in at least one CBG in the TB, or determining a priority of a TB based on a quantity of CBGs comprised in the TB.

13. The communication method of claim 12, wherein the priority condition indicates that a TB with a lower service priority has a higher priority, wherein the priority condition indicates that a TB with an earlier scheduling time has a higher priority, wherein the priority condition indicates that a TB with a smaller quantity of CBs comprised in a CBG has a higher priority, wherein the priority condition indicates that a TB with a smaller quantity of comprised CBGs has a higher priority, or wherein the priority condition indicates that a TB with a larger quantity of comprised CBGs has a higher priority.

14. A communications device, comprising:
a processor; and
a memory coupled to the processor and storing instructions that, when executed by the processor, cause the communications device to be configured to:
receive N transport blocks (TBs) from a second device, wherein each TB comprises at least one code block group (CBG), and wherein N is a positive integer;
determine a hybrid automatic repeat request (HARQ) feedback bit of each CBG in the N TBs;
determine a feedback bit stream of the N TBs based on the HARQ feedback bit of each CBG in the N TBs, wherein a quantity of bits of the feedback bit stream is equal to or less than a total quantity of CBGs in the N TBs, and wherein the feedback bit stream of the N TBs is determined by:
determining a first threshold, wherein the first threshold indicates that HARQ feedback bits of a CBG whose quantity reaches the first threshold are bundled as one feedback bit, wherein the first threshold is determined by receiving first indication information from the second device, and wherein the first indication information indicates the first threshold; and
bundling HARQ feedback bits of the CBGs in the N TBs based on the first threshold to obtain the feedback bit stream; and
send the feedback bit stream to the second device.

15. The communications device of claim 14, wherein bundling the HARQ feedback bits of the CBGs in the N TBs based on the first threshold to obtain the feedback bit stream comprises bundling the HARQ feedback bits of a CBG of each of the N TBs based on the first threshold to obtain the feedback bit stream, and wherein CBGs corresponding to a same bit in the feedback bit stream belong to a same TB.

16. The communications device of claim 14, wherein N is an integer greater than 1, wherein bundling the HARQ feedback bits of the CBGs in the N TBs based on the first threshold to obtain the feedback bit stream comprises bundling the HARQ feedback bits of the CBGs in the N TBs uniformly based on the first threshold to obtain the feedback bit stream, and wherein CBGs corresponding to at least one bit in the feedback bit stream belong to different TBs.

17. The communications device of claim 14, wherein determining the feedback bit stream of the N TBs based on the HARQ feedback bit of each CBG in the N TBs further comprises:
receiving third indication information from the second device, wherein the third indication information indicates that HARQ feedback bits of at least two CBGs in at least one of the N TBs are to be bundled; and
bundling the HARQ feedback bits of the at least two CBGs in the at least one TB based on the third indication information to obtain the feedback bit stream.

18. The communications device of claim 14, wherein determining the feedback bit stream of the N TBs based on the HARQ feedback bit of each CBG in the N TBs further comprises:
determining a third threshold, wherein the third threshold indicates a threshold of the quantity of bits of the feedback bit stream;
bundling the HARQ feedback bits of the CBGs in the N TBs based on a priority of a TB to obtain the feedback bit stream, wherein the quantity of bits of the feedback bit stream is less than or equal to the third threshold; and
determining that the priority of the TB is based on a priority condition, wherein the priority condition comprises at least one of determining a priority of a TB based on a service type of the TB, determining a priority of a TB based on a scheduling time of the TB, determining a priority of a TB based on a quantity of code blocks comprised in at least one CBG in the TB, or determining a priority of a TB based on a quantity of CBGs comprised in the TB.

19. The communications device of claim 18, wherein determining the priority of the TB based on the priority condition comprises determining that a TB with a lower service priority has a higher priority, a TB with an earlier scheduling time has a higher priority, a TB with a smaller quantity of code blocks comprised in a CBG having a higher priority, a TB with a smaller quantity of comprised CBGs having a higher priority, or a TB with a larger quantity of comprised CBGs having a higher priority.

20. The communications device of claim 18, wherein the priority condition comprises at least two priority conditions, wherein an execution sequence priority is between the at least two priority conditions, wherein the execution sequence priority between the priority conditions is preconfigured or is configured by the second device 12, and wherein bundling the HARQ feedback bits further comprises either bundling HARQ feedback bits of a CBG in a next TB when the TB corresponds to one feedback bit or bundling the HARQ feedback bits of the CBGs in the TBs in turn.

* * * * *